(12) United States Patent
Miyashita et al.

(10) Patent No.: US 12,469,169 B2
(45) Date of Patent: Nov. 11, 2025

(54) CROP ROW DETECTION SYSTEM, AGRICULTURAL MACHINE HAVING A CROP ROW DETECTION SYSTEM, AND METHOD OF CROP ROW DETECTION

(71) Applicant: KUBOTA CORPORATION, Osaka (JP)

(72) Inventors: Shunsuke Miyashita, Sakai (JP); Toru Tambo, Sakai (JP); Mitsuaki Nagao, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 76 days.

(21) Appl. No.: 18/392,251

(22) Filed: Dec. 21, 2023

(65) Prior Publication Data

US 2024/0202966 A1 Jun. 20, 2024

Related U.S. Application Data

(63) Continuation of application No. PCT/JP2022/004547, filed on Feb. 4, 2022.

(30) Foreign Application Priority Data

Jun. 29, 2021 (JP) .................................. 2021-107919

(51) Int. Cl.
*G06T 7/73* (2017.01)
*A01B 69/00* (2006.01)
(Continued)

(52) U.S. Cl.
CPC .............. *G06T 7/73* (2017.01); *A01B 69/001* (2013.01); *A01B 69/008* (2013.01);
(Continued)

(58) Field of Classification Search
CPC .. A01B 69/001; A01B 69/008; B62D 15/025; G06T 7/73; G06T 7/90;
(Continued)

(56) References Cited

U.S. PATENT DOCUMENTS 6,278,918 B1 * 8/2001 Dickson ............... G06V 20/588
701/28
6,285,930 B1 * 9/2001 Dickson .................... G06T 7/66
701/28

(Continued)

FOREIGN PATENT DOCUMENTS

JP H09201110 A * 8/1997
JP 2006101816 A * 4/2006
(Continued)

OTHER PUBLICATIONS

Official Communication issued in International Patent Application No. PCT/JP2022/004547, mailed on Apr. 12, 2022.
(Continued)

*Primary Examiner* — John M Zaleskas
(74) *Attorney, Agent, or Firm* — Keating & Bennett, LLP

(57) ABSTRACT

A crop row detection system includes a camera mounted to an agricultural machine to image a ground surface traveled by the agricultural machine to acquire time-series color images including at least a portion of the ground surface, and a processor configured or programmed to (i) perform image processing for the time-series color images, (ii) generate, from the time-series color images, an enhanced image in which a color of a crop row for detection is enhanced to provide an enhanced image, (iii) generate from the enhanced image a plan view image as viewed from above the ground surface, the plan view image being classified into first pixels having a color index value for the crop row equal to or greater than a threshold and second pixels having the color index value below the threshold, and (iv) determine posi- (Continued)

tions of edge lines of the crop row based on the color index values of the first pixels.

10 Claims, 17 Drawing Sheets

(51) Int. Cl.
*A01B 69/04* (2006.01)
*B62D 15/02* (2006.01)
*G06T 7/90* (2017.01)
*G06V 10/44* (2022.01)
*G06V 10/56* (2022.01)

(52) U.S. Cl.
CPC .............. *B62D 15/025* (2013.01); *G06T 7/90* (2017.01); *G06V 10/44* (2022.01); *G06V 10/56* (2022.01); *G06T 2207/10024* (2013.01); *G06T 2207/20021* (2013.01); *G06T 2207/20072* (2013.01); *G06T 2207/30188* (2013.01); *G06T 2207/30252* (2013.01)

(58) Field of Classification Search
CPC . G06T 2207/10016; G06T 2207/10024; G06T 2207/20021; G06T 2207/20072; G06T 2207/30188; G06T 2207/30252; G06V 10/44; G06V 10/50; G06V 10/56; G06V 20/56; G06V 20/588
See application file for complete search history.

(56) References Cited

U.S. PATENT DOCUMENTS

| | | | | |
|---|---|---|---|---|
| 6,385,515 B1* | 5/2002 | Dickson | ............... | G06V 20/588 701/28 |
| 6,490,539 B1* | 12/2002 | Dickson | ............... | G06V 20/588 340/684 |
| 6,686,951 B1* | 2/2004 | Dickson | ................ | G06V 20/38 348/120 |
| 6,721,453 B1* | 4/2004 | Benson | ................... | G06T 7/143 701/28 |
| 2005/0088643 A1* | 4/2005 | Anderson | ................ | G01C 3/08 356/5.04 |
| 2007/0001096 A1* | 1/2007 | Wei | ...................... | A01B 69/001 250/208.1 |
| 2007/0001097 A1* | 1/2007 | Wei | ...................... | A01B 69/001 250/208.1 |
| 2007/0003107 A1* | 1/2007 | Wei | ....................... | G06V 20/10 382/104 |
| 2007/0005208 A1* | 1/2007 | Han | ..................... | A01B 69/001 701/50 |
| 2007/0014434 A1* | 1/2007 | Wei | ...................... | G06V 10/243 382/104 |
| 2007/0271012 A1* | 11/2007 | Jochem | ................ | A01B 69/001 701/28 |
| 2007/0271013 A1* | 11/2007 | Jochem | .................. | G01C 11/00 701/28 |
| 2008/0289308 A1* | 11/2008 | Brubaker | ........... | A01D 41/1278 56/10.2 F |
| 2015/0321694 A1* | 11/2015 | Nelson, Jr. | ........... | G05D 1/0246 382/104 |
| 2015/0324648 A1* | 11/2015 | Wilson | .................. | G06V 20/20 382/104 |
| 2017/0228595 A1* | 8/2017 | Wilson | .................. | G06V 20/20 |
| 2018/0325012 A1* | 11/2018 | Ferrari | ................. | A01B 69/001 |
| 2018/0376128 A1* | 12/2018 | Jensen | ................. | H04N 13/289 |
| 2020/0020103 A1* | 1/2020 | Sneyders | ................. | G06T 7/12 |
| 2020/0021716 A1* | 1/2020 | Sneyders | ............. | H04N 1/6008 |
| 2020/0334859 A1* | 10/2020 | Sneyders | ............. | G06T 7/80 |
| 2021/0000006 A1* | 1/2021 | Ellaboudy | ............ | A01B 69/001 |
| 2021/0012517 A1* | 1/2021 | Sneyders | ............... | A01C 14/00 |
| 2021/0360850 A1* | 11/2021 | Wu | ..................... | A01D 41/1278 |
| 2022/0044411 A1* | 2/2022 | Sneyders | .................. | G06T 7/73 |
| 2022/0124221 A1* | 4/2022 | Sneyders | ............. | H04N 1/6063 |
| 2022/0189063 A1* | 6/2022 | Sneyders | ............... | G01C 21/20 |
| 2022/0192175 A1* | 6/2022 | Humpal | .................... | G06T 7/70 |
| 2022/0377962 A1* | 12/2022 | Susko | .................. | G05D 1/0246 |
| 2023/0222678 A1* | 7/2023 | Sneyders | ................ | G06T 7/536 382/106 |
| 2024/0130263 A1* | 4/2024 | Miyashita | ............ | A01B 69/001 |
| 2024/0196781 A1* | 6/2024 | Miyashita | ................ | G06T 7/74 |
| 2024/0315158 A1* | 9/2024 | Miyashita | .............. | G05D 1/648 |
| 2024/0315159 A1* | 9/2024 | Miyashita | .............. | G05D 1/243 |
| 2024/0338948 A1* | 10/2024 | Miyashita | ............. | G06V 10/764 |
| 2024/0428583 A1* | 12/2024 | Arakawa | ............. | G06V 10/764 |

FOREIGN PATENT DOCUMENTS

| | | | | |
|---|---|---|---|---|
| JP | | 2016208871 A | * 12/2016 | |
| WO | WO-2020262287 A1 | * 12/2020 | ........... A01B 69/008 | |

OTHER PUBLICATIONS

Okamoto et al., "Crop-Row Detector for Row-following Control Systems (Part 1)—Comparison and Evaluation of Detecting Systems", Journal of the Japanese Society of Agricultural Machinery, vol. 61, No. 6, Nov. 1, 1999, pp. 159-167.

Okamoto et al., "Visual Sensor for Crop-Row Following Robot", Lecture abstracts of the 58th Japanese Society of Agricultural Machinery, Apr. 1, 1999, pp. 231 & 232.

Ponnambalam et al., "Autonomous Crop Row Guidance Using Adaptive Multi-ROI in Strawberry Fields", Sensors, vol. 20, Sep. 14, 2020, pp. 1-17.

* cited by examiner

SCANNING LINE POSITION

CROP ROW DETECTION SYSTEM, AGRICULTURAL MACHINE HAVING A CROP ROW DETECTION SYSTEM, AND METHOD OF CROP ROW DETECTION

CROSS REFERENCE TO RELATED APPLICATIONS

This application claims the benefit of priority to Japanese Patent Application No. 2021-107919 filed on Jun. 29, 2021 and is a Continuation Application of PCT Application No. PCT/JP2022/004547 filed on Feb. 4, 2022. The entire contents of each application are hereby incorporated herein by reference.

BACKGROUND OF THE INVENTION

1. Field of the Invention

The present disclosure relates to a crop row detection system, an agricultural machine including a crop row detection system, and a method of crop row detection.

2. Description of the Related Art

Research and development has been directed to the automation of work vehicles, such as tractors, to be used in fields. For example, work vehicles have been put to practical use which travel via automatic steering by utilizing a positioning system capable of precise positioning, e.g., GNSS (Global Navigation Satellite System). Work vehicles that automatically perform speed control as well as automatic steering have also been put to practical use.

Moreover, vision guidance systems are being developed which detect rows of crops (crop rows) or ridges in a field by using an imaging device such as a camera, and control the travel of a work vehicle along the detected crop rows or ridges.

Japanese Laid-Open Patent Publication No. 2016-208871 discloses a work machine that travels along a ridge in cultivated land where crops are planted in ridges which are formed in rows. Japanese Laid-Open Patent Publication No. 2016-208871 describes binarizing a raw image acquired by capturing cultivated land from obliquely above with an onboard camera, and thereafter generating a planar perspective projection image. In the technique disclosed in Japanese Laid-Open Patent Publication No. 2016-208871, the planar perspective projection image is rotated to generate a number of rotated images with different orientations to detect work paths between ridges.

SUMMARY OF THE INVENTION

In techniques of detecting crop rows or ridges by using an imaging device, the accuracy of detection may be degraded by disturbance factors such as daylight conditions.

Preferred embodiments of the present invention provide crop row detection systems, agricultural machines including crop row detection systems, and methods of crop row detection that can solve such problems.

In an illustrative, non-limiting preferred embodiment, a row detection system according to the present disclosure includes a camera mounted to an agricultural machine to image a ground surface traveled by the agricultural machine to acquire time-series color images including at least a portion of the ground surface, and a processor configured or programmed to perform image processing for the time-series color images, generate from the time-series color images an enhanced image in which a color of a crop row for detection is enhanced to provide an enhanced image, generate from the enhanced image a plan view image as viewed from above the ground surface, the plan view image being classified into first pixels having a color index value for the crop row equal to or greater than a threshold and second pixels having the color index value below the threshold, and determine positions of edge lines of the crop row based on the color index values of the first pixels.

In an illustrative, non-limiting preferred embodiment, an agricultural machine according to the present disclosure is an agricultural machine including the row detection system according to the non-limiting preferred embodiment described above, a wheel, and an automatic steering controller configured or programmed to control a steering angle of the wheel based on positions of edge lines of the crop row as determined by the crop row detection system.

In an illustrative, non-limiting preferred embodiment, a method of row detection according to the present disclosure is a computer-implemented method of row detection, the method of row detection causing a computer to execute acquiring from a camera mounted to an agricultural machine, time-series color images by imaging a ground surface that is traveled by the agricultural machine, the time-series color images including at least a portion of the ground surface, generating from the time-series color images an enhanced image in which a color of a crop row for detection is enhanced, generating from the enhanced image a plan view image as viewed from above the ground surface, the plan view image being classified into first pixels having a color index value for the crop row equal to or greater than a threshold and second pixels of having the color index value below the threshold, and determining positions of edge lines of the crop row based on the color index values of the first pixels.

General or specific aspects of various example preferred embodiments of the present disclosure may be implemented using a device, a system, a method, an integrated circuit, a computer program, a non-transitory computer-readable storage medium, or any combination thereof. The computer-readable storage medium may be inclusive of a volatile storage medium, or a non-volatile storage medium. The device may include a plurality of devices. In the case where the device includes two or more devices, the two or more devices may be disposed within a single apparatus, or divided over two or more separate apparatuses.

According to preferred embodiments of the present disclosure, deteriorations in detection accuracy due to disturbance factors such as daylight conditions can be reduced or prevented to achieve enhanced robustness.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
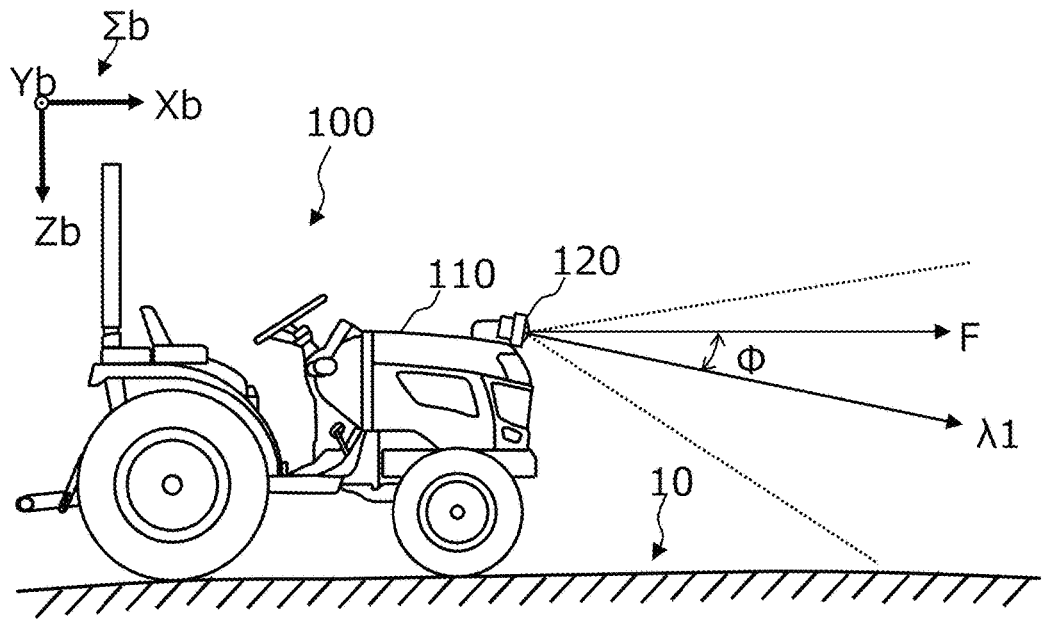
FIG. 1 is a diagram schematically showing how an imaging device that is mounted to an agricultural machine may image the ground surface.

Hereinafter, preferred embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, elements having identical or similar functions are denoted by identical reference numerals.

The following preferred embodiments are only examples, and the technique according to the present disclosure is not limited to the following preferred embodiments. For example, numerical values, shapes, materials, steps, and orders of steps, layout of a display screen, etc., that are indicated in the following preferred embodiments are only examples, and admit of various modifications so long as it makes technological sense. Any one implementation may be combined with another so long as it makes technological sense to do so.

As used in the present disclosure, an "agricultural machine" broadly includes any machine that performs basic tasks of agriculture, e.g., "tilling", "planting", and "harvesting", in fields. An agricultural machine is a machine that has a functionality and structure to perform agricultural operations such as tilling, seeding, preventive pest control, manure spreading, planting of crops, or harvesting for the ground surface within a field. Such agricultural work, tasks, or operations may be referred to as "groundwork", or simply as "work", "tasks", or "operations". An agricultural machine does not need to possess traveling equipment for itself to move, but may travel by being attached to or towed by another vehicle that possesses traveling equipment. Not only does a work vehicle, such as a tractor, function as an "agricultural machine" by itself alone, but an implement that is attached to or towed by a work vehicle and the work vehicle may as a whole function as one "agricultural machine". Examples of agricultural machines include tractors, vehicles for crop management, vegetable transplanters, mowers, and field-moving robots.

Preferred Embodiment 1

A crop row detection system and a method of crop row detection according to an illustrative first preferred embodiment of the present disclosure will be described.

A crop row detection system according to the present preferred embodiment includes an imaging device (camera) to be mounted to an agricultural machine in use. The imaging device is fixed to an agricultural machine so as to image the ground surface to be traveled by the agricultural machine, and to acquire time-series color images including at least a portion of the ground surface.

FIG. 1 schematically shows how an imaging device 12 (camera) that is mounted to an agricultural machine 100 such as a tractor or a vehicle for crop management may image the ground surface 10, for example. In the example of FIG. 1, the agricultural machine 100 includes a vehicle body 110 that is capable of traveling, and the imaging device 120 is fixed to the vehicle body 110. For referencing sake, FIG. 1 shows a body coordinate system Σb having an Xb axis, a Yb axis, and a Zb axis that are orthogonal to one another. The body coordinate system Σb is a coordinate system that is fixed to the agricultural machine 100, and the origin of the body coordinate system Σb may be set near the centroid of the agricultural machine 100, for example. In the figure, for ease of viewing, the origin of the body coordinate system Σb is illustrated as lying external to the agricultural machine 100. In the body coordinate system Σb according to the present disclosure, the Xb axis coincides with the traveling direction (direction of arrow F) when the agricultural machine 100 is traveling straight. When viewing from the coordinate origin in the positing direction along the Xb axis, the Yb axis coincides with the directly right direction, and the Zb axis coincides with the vertically downward direction.

The imaging device 120 is, for example, an onboard camera that includes a CCD (Charge Coupled Device) or a CMOS (Complementary Metal Oxide Semiconductor) image sensor. The imaging device 120 according to the present preferred embodiment is a monocular camera that is capable of capturing motion pictures at a frame rate of 3 frames/second (fps: frames per second) or above, for example.

Figure 2:
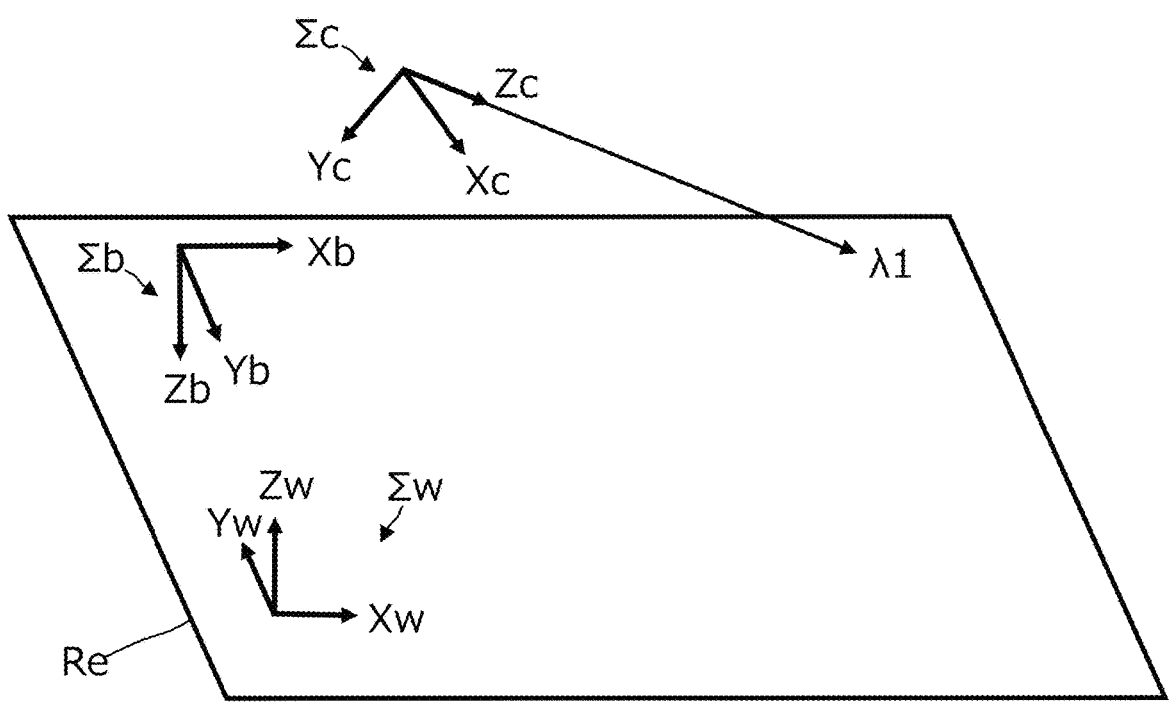
FIG. 2 is a perspective view schematically showing a relationship among a body coordinate system $\Sigma b$ and a camera coordinate system $\Sigma c$ that are fixed to the agricultural machine and a world coordinate system $\Sigma w$ that is fixed to the ground surface.

FIG. 2 is a perspective view schematically showing a relationship among the aforementioned body coordinate system Σb, a camera coordinate system Σc of the imaging device 120, and a world coordinate system Σw that is fixed to the ground surface 10. The camera coordinate system Σc has an Xc axis, a Yc axis, and a Zc axis that are orthogonal to one another, whereas the world coordinate system Σw has an Xw axis, a Yw axis, and a Zw axis that are orthogonal to one another. In the example of FIG. 2, the Xw axis and the Yw axis of the world coordinate system Σw are on a reference plane Re that extends along the ground surface 10.

The imaging device 120 is mounted at a predetermined position of the agricultural machine 100 so as to face in a predetermined direction. Therefore, the position and orientation of the camera coordinate system Σc with respect to the body coordinate system ab are fixed in a known state. The Zc axis of the camera coordinate system Σc is on the camera optical axis λ1. In the illustrated example, the camera optical axis λ1 is inclined from the traveling direction F of the agricultural machine 100 toward the ground surface 10, with an angle of depression Φ that is greater than 0°. The traveling direction F of the agricultural machine 100 is schematically parallel to the ground surface 10 along which the agricultural machine 100 is traveling. The angle of depression Φ may be set to a range of, e.g., not less than 0° and not more than 60°. In the case where the position at which the imaging device 120 is mounted is close to the ground surface 10, the orientation of the camera optical axis λ1 may be set so that the angle of depression Φ has a negative value, that is, a positive angle of elevation.

When the agricultural machine 100 is traveling on the ground surface 10, the body coordinate system ab and the camera coordinate system Σc translate relative to the world coordinate system Σw. If the agricultural machine 100 rotates or swings in directions of pitch, roll, and yaw during travel, the body coordinate system Σb and the camera coordinate system Σc may rotate relative to the world coordinate system Σw. In the following description, for simplicity, it is assumed that the agricultural machine 100 does not rotate in pitch and roll directions and that the agricultural machine 100 moves essentially parallel to the ground surface 10.

Figure 3:
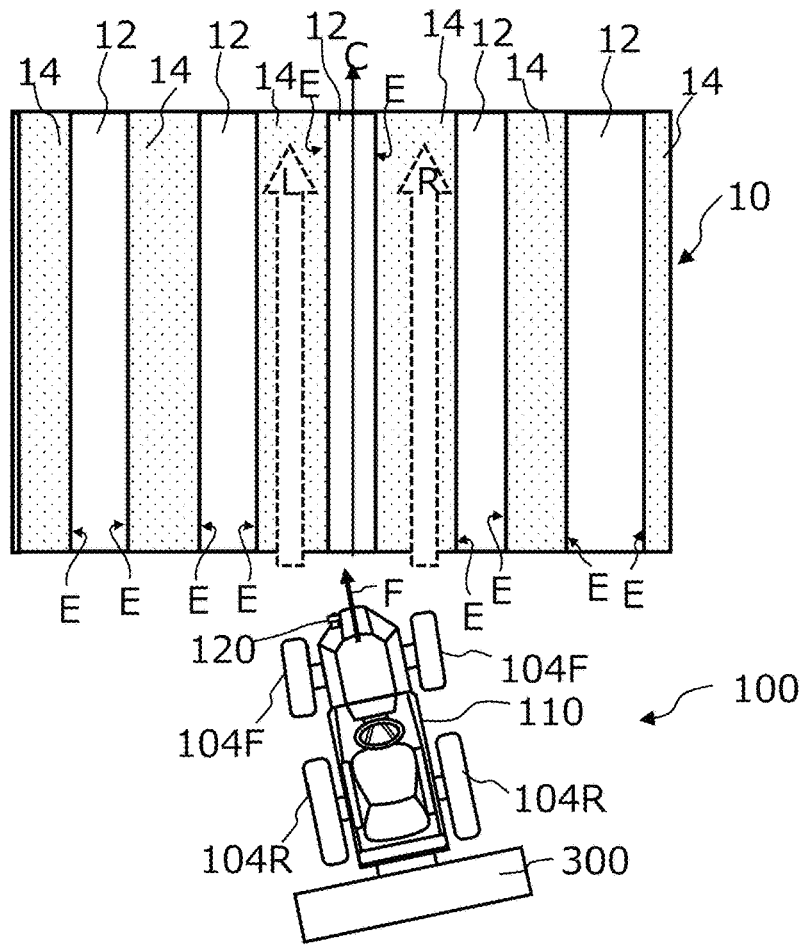
FIG. 3 is a top view schematically showing a portion of a field in which a multiple crop rows are made on the ground surface.

FIG. 3 is a top view schematically showing a portion of a field in which a multiple crop rows 12 are made on the ground surface 10. A crop row 12 is a row that is defined by crops are continuously planted on the ground surface 10 of the field in one direction. In other words, a crop row 12 is an aggregation of crops that are planted in a ridge of the field. Thus, because each individual crop row 12 is a row that is created by an aggregation of crops that have been planted in the field, strictly speaking, the shape of a crop row may be complex depending on the shapes of crops and the arrangement of crops. The width of the crop row 12 changes with crop growth.

Between adjacent crop rows 12, a belt-shaped intermediate region 14, in which no crops have been planted, exists. In between two adjacent crop rows 12, each intermediate region 14 is a region that is interposed between two opposing edge lines E. In the case where multiple crops are planted for one ridge in a width direction of the ridge, multiple crop rows 12 will be provided upon the one ridge. In other words, multiple crop rows 12 will be located within the width of the ridge. In such a case, among the multiple crop rows 12 that are provided on the ridge, an edge line E of the crop row 12 that is located at an end of the width direction of the ridge serves as a delineator of an intermediate region 14. In other words, an intermediate region 14 lies between the edge lines E of crop rows 12 that are located at ends of ridges along the width direction, among the edge lines E of multiple crop rows 12.

Since an intermediate region 14 functions as a region (work path) through which the wheels of the agricultural machine 100 may pass, an "intermediate region" may be referred to as a "work path".

In the present disclosure, an "edge line" of a crop row means a reference line segment (which may also include a curve) to define a target path for an agricultural machine to travel. Such reference line segments may be defined as both ends of a belt-shaped region (work path) through which the wheels of the agricultural machine are allowed to pass. The specific method of determining the "edge lines" of a crop row will be described later.

FIG. 3 schematically depicts an agricultural machine 100 that is about to enter into a field in which crop rows 12 are made. The agricultural machine 100 includes right and left front wheels 104F and right and left rear wheels 104R as traveling equipment, and is towing an implement 300. The front wheels 104F are the wheels responsible for steering.

In the example of FIG. 3, thick broken-lined arrows L and R are indicated for the respective work paths 14 that are located on opposite sides of a crop row 12 in the middle. When the agricultural machine 100 travels on a target path that is indicated by a solid-lined arrow C, the front wheels 104F and the rear wheels 104R of the agricultural machine 100 are expected to move along the arrows L and R in the work paths 14, so as not to step on the crop row 12. In the present preferred embodiment, because the edge lines E of the crop row 12 can be detected by using the imaging device 120 mounted to the agricultural machine 100, it is possible to control the steering and travel of the agricultural machine 100 so that the front wheels 104F and the rear wheels 104R will move along arrows L and R in the work paths 14. Controlling the steering and travel of the agricultural machine 100 based on the edge lines E of the crop row in this manner may be referred to as "row-following control".

Figure 4:
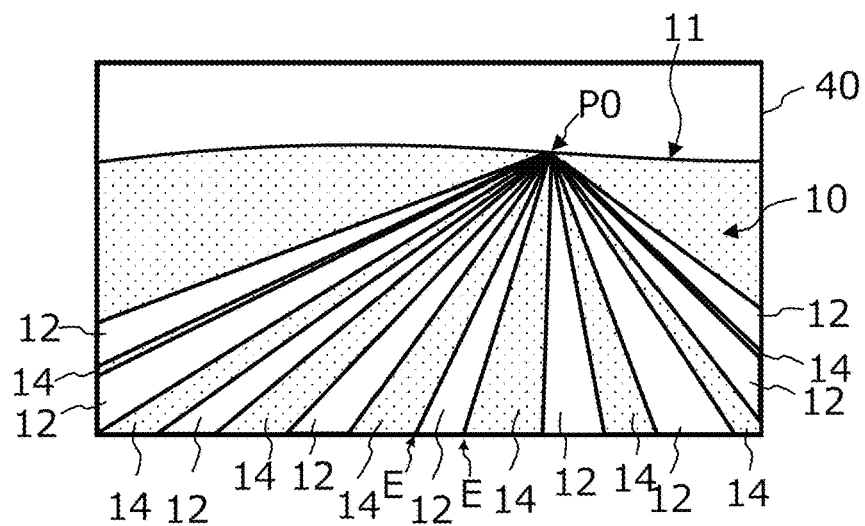
FIG. 4 is a diagram schematically showing an example of an image that is acquired by the imaging device of the agricultural machine shown in FIG. 3.

FIG. 4 is a diagram schematically showing an example of an image 40 that is acquired by the imaging device 120 of the agricultural machine 100 shown in FIG. 3. Theoretically, the multiple crop rows 12 and intermediate regions (work paths) 14 extending in parallel or substantially in parallel on the ground surface 10 intersect at a vanishing point P0 on the horizon 11. The reason why the vanishing point P0 is located in a right-hand region of the image 40 is that, as shown in FIG. 3, the traveling direction F of the agricultural machine 100 is inclined from the direction in which the crop rows 12 extend (a direction parallel or substantially parallel to arrow C).

In the present preferred embodiment, by a method described below, even if the daylight conditions or the growth state of crops changes, it is possible to accurately detect the crop rows 12 from such an image 40 and determine edge lines E of the crop rows 12. Then, based on the edge lines E, a path in which the agricultural machine 100 should proceed (target path) can be appropriately generated. As a result, through automatic steering, it becomes possible to control the travel of the agricultural machine 100 so that the front wheels 104F and the rear wheels 104R of the agricultural machine 100 will move along arrows L and R within the work paths 14 (row-following control). Through such row-following control, a precise automatic steering that is adapted to the state of growth of crops can be achieved which cannot be attained by automatic steering techniques that utilize GNSS or other positioning systems.

Figure 5:
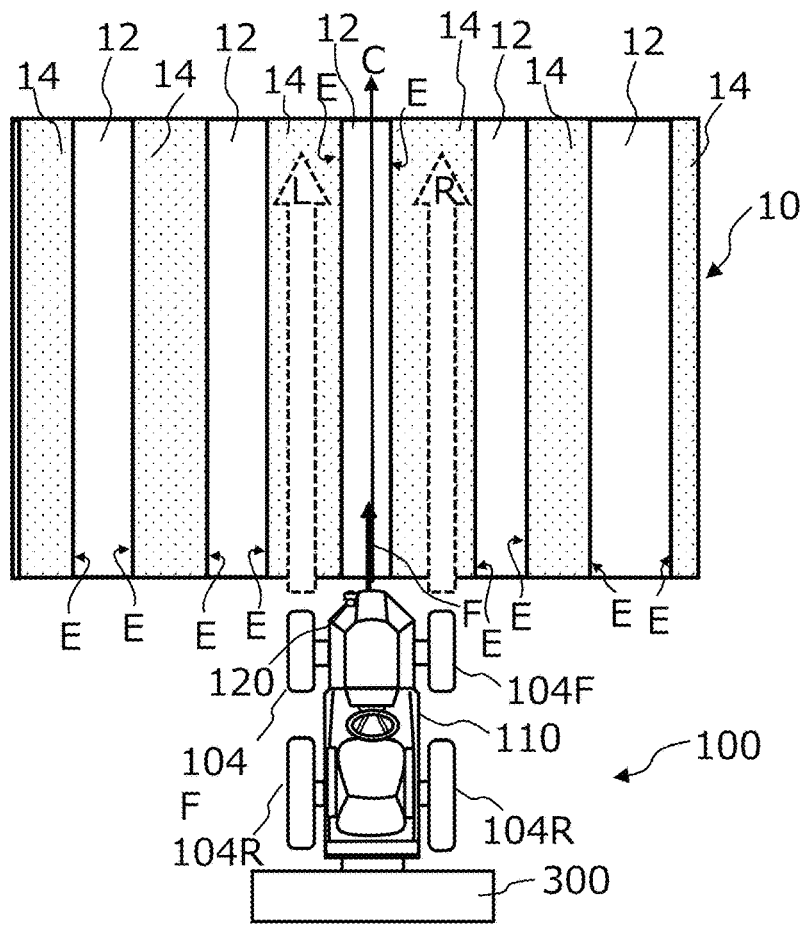
FIG. 5 is a top view schematically showing a state where the position and orientation (angle in yaw directions) of the agricultural machine are adjusted.
Figure 6:
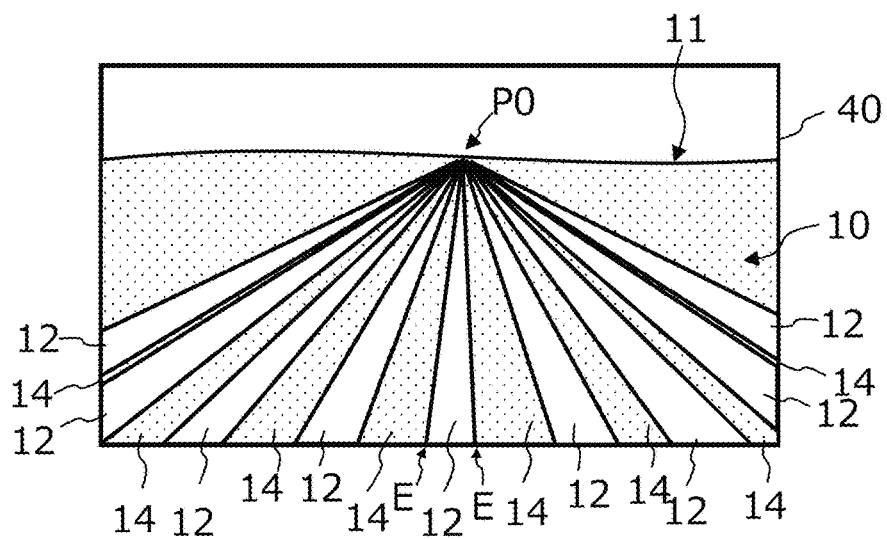
FIG. 6 is a diagram showing an example of an image acquired by the imaging device of the agricultural machine in the state of FIG. 5.

FIG. 5 is a top view schematically showing a state where the agricultural machine 100 is steered to reduce the positional error with respect to a target path (arrow C), thereby adjusting the position and orientation (angle in yaw directions) of the agricultural machine 100. FIG. 6 is a diagram showing an example of an image 40 acquired by the imaging device 120 of the agricultural machine 100 in such a state. The front wheels 104F and the rear wheels 104R of the agricultural machine 100 in the state of FIG. 5 are respectively located on lines in work paths 14 indicated by arrow L and arrow R. When the agricultural machine 100 travels along a target path C indicated by central arrow C, the automatic steering device in the agricultural machine 100 controls the steering angles of the wheels responsible for steering so that the front wheels 104F and the rear wheels 104R will not deviate from the work paths 14.

Hereinafter, the configuration and operation of a crop row detection system according to a preferred embodiment of the present disclosure will be described in detail.

Figure 7:
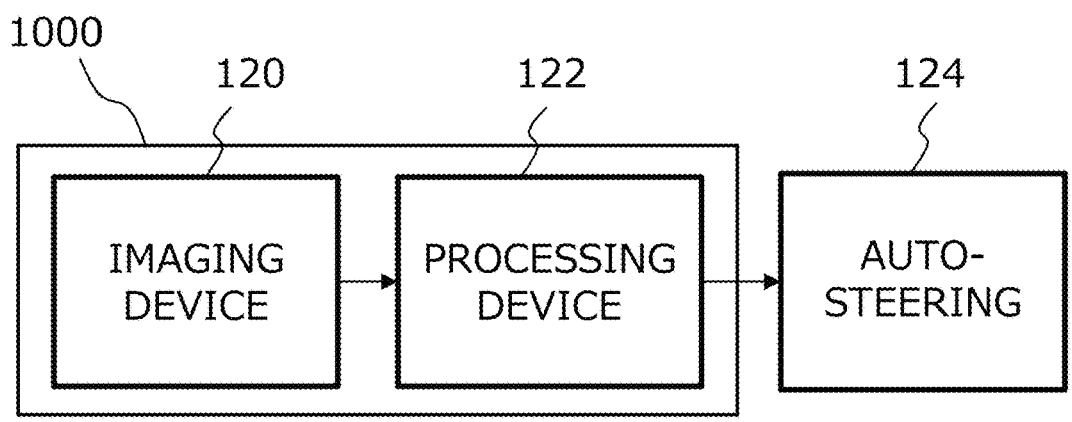
FIG. 7 is a block diagram showing an example of a basic configuration of a crop row detection system according to a first preferred embodiment of the present disclosure.

As shown in FIG. 7, a crop row detection system 1000 according to the present preferred embodiment includes the aforementioned imaging device 120 (camera) and a processing device 122 (processor) configured or programmed to perform image processing for time-series color images that are acquired from the imaging device 120. The processing device 122 (processor) may be connected to an automatic steering device 124 which is included in the agricultural machine 100, for example. The automatic steering device 124 (automatic steering controller) is included in a self-driving device that controls the travel of the agricultural machine 100, for example.

The processing device 122 (processor) can be implemented by an electronic control unit (ECU) for image recognition. The ECU is a computer for onboard use. The processing device 122 (processor) is connected to the imaging device 120 via serial signal lines, e.g., a wire harness, so as to receive image data that is output from the imaging device 120. A portion of the image recognition processing that is performed by the processing device 122 (processor) may be performed inside the imaging device 120 (inside a camera module).

Figure 8:
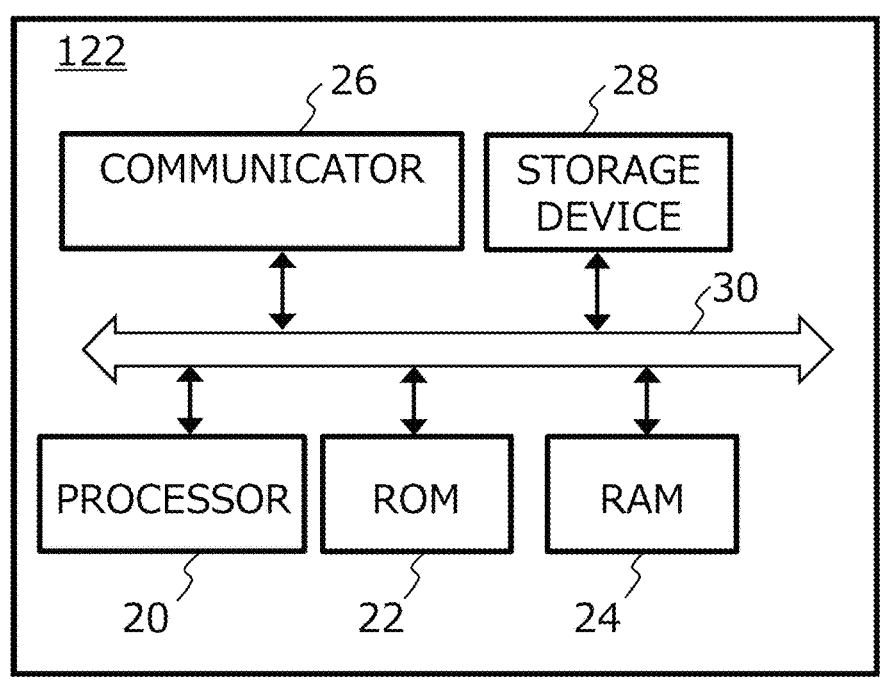
FIG. 8 is a block diagram schematically showing an example configuration of a processing device in the first preferred embodiment of the present disclosure.

FIG. 8 is a block diagram showing an example hardware configuration of the processing device 122 (processor). The processing device 122 includes a processor 20, a ROM (Read Only Memory) 22, a RAM (Random Access Memory) 24, a communicator 26, and a storage device 28. These elements are connected to one another, for example, via buses 30.

The processor 20 may be a semiconductor integrated circuit, and referred to also as a central processing unit (CPU) or a microprocessor. The processor 20 may include an image processing unit (GPU). The processor 20 consecutively executes a computer program describing predetermined instructions, which is stored in the ROM 22, to realize processing that is needed for the crop row detection according to the present disclosure. An entirety or a portion of the processor 20 may be an FPGA (Field Programmable Gate Array), an ASIC (Application Specific Integrated Circuit), or an ASSP (Application Specific Standard Product) in which a CPU is mounted.

The communicator 26 is an interface configured or programmed to perform data communication between the processing device 122 and an external computer. The communicator 26 can perform wired communication based on a CAN (Controller Area Network) or the like, or wireless communication complying with the Bluetooth (registered trademark) standards and/or the Wi-Fi (registered trademark) standards.

The storage device 28 is able to store data of images acquired from the imaging device 120 or images which are under processing. Examples of the storage device 28 include a hard disk drive and a non-volatile semiconductor memory.

The hardware configuration of the processing device 122 (processor) is not limited to the above examples. An entirety or a portion of the processing device 122 (processor) does not need to be mounted on the agricultural machine 100. By utilizing the communicator 26, one or more computers located outside the agricultural machine 100 may be allowed to function as a whole or a part of the processing device 122. For example, a server computer that is connected to a network may function as an entirety or a portion of the processing device 122. On the other hand, a computer mounted in the agricultural machine 100 may be configured or programmed to perform all functions that are required of the processing device 122 (processor).

In the present preferred embodiment, such a processing device 122 (processor) is configured or programmed to acquire time-series color images from the imaging device 120, and perform operations S1, S2 and S3 below.

(S1) from time-series color images, generate an enhanced image in which the color of a crop row for detection is enhanced.

(S2) from the enhanced image, generate a plan view image as viewed from above the ground surface, the plan view image being classified into first pixels having a color index value for the crop row equal to or greater than a threshold and second pixels having the color index value below the threshold.

(S3) based on the index values of the first pixels, determine positions of edge lines of the crop row.

Hereinafter, specific examples of operations S1, S2 and S3 will be described in detail.

The time-series color images are an aggregation of images that are chronologically acquired by the imaging device 120 (camera) through imaging. Each image includes a frame-by-frame group of pixels. For example, when the imaging device 120 outputs images at a frame rate of 30 frames/second, the processing device 122 is able to acquire new images with a period of about 33 milliseconds. As compared to the speed of a common automobile that travels on public roads, the agricultural machine 100, such as a tractor, travels in a field at a speed which is relatively low, e.g., about 10 kilometers per hour or lower. In the case of 10 kilometers per hour, a distance of about 6 centimeters is travelled in about 33 milliseconds. Therefore, the processing device 122 may acquire images with a period of, e.g., about 100 to 300 milliseconds, and does not need to process every frame of image captured by the imaging device 120. The period with which images to be processed by the processing device 122 are acquired may be automatically changed by the processing device 122 in accordance with the traveling speed of the agricultural machine 100.

Figure 9:
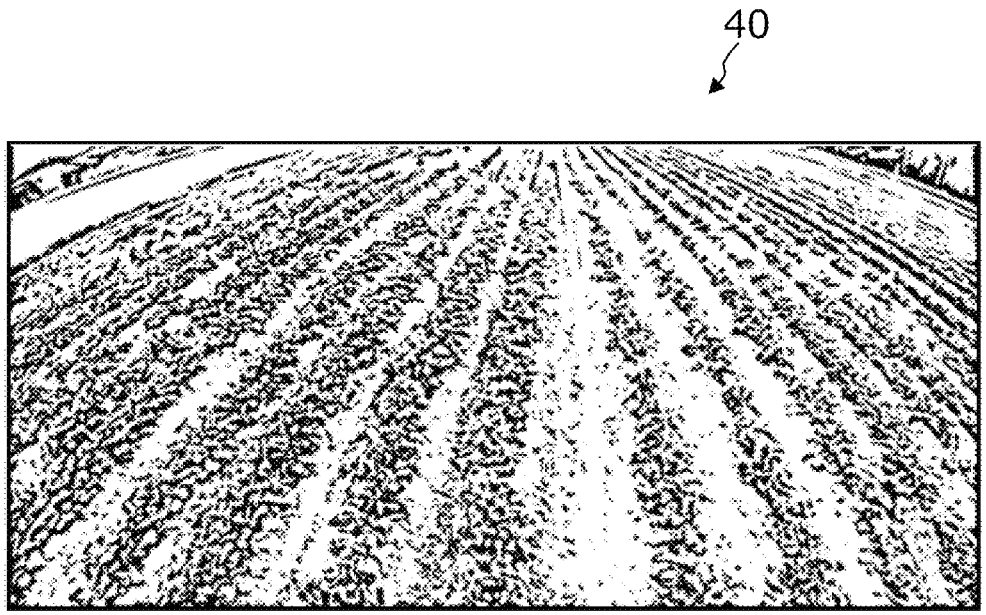
FIG. 9 is a monochromatic image corresponding to one frame of image, among time-series color images acquired by an onboard camera mounted on a tractor.

FIG. 9 is an image corresponding to one frame of image 40, among time-series color images that have been acquired by an imaging device mounted on the agricultural machine (which in this example is a monocular camera). Rows of crops (crop rows) appear in the image of FIG. 9, which are planted in rows on the ground surface of a field. In this example, the rows of crops are arranged essentially in parallel and at equal or substantially equal intervals on the ground surface, such that the camera optical axis of the imaging device is in the traveling direction of the agricultural machine. As described earlier, the camera optical axis does not need to be parallel to the traveling direction of the agricultural machine, but may meet the ground surface frontward of the traveling direction of the agricultural machine. The mounted position of the imaging device is not limited to this example. In the case where a plurality of imaging devices are mounted to the agricultural machine, some of the imaging device may have their camera optical axes oriented in an opposite direction to the traveling direction, or in a direction intersecting the traveling direction.

In operation S1, based on time-series color images that have been acquired from the imaging device 120, the processing device 122 in FIG. 7 generates an image (enhanced image) in which the color of a crop row for detection is enhanced. Crops perform photosynthesis with sunlight (white light), and therefore contain chlorophyll. Chlorophyll has a lower optical absorption rate for green than for red or blue. Therefore, the spectrum of sunlight that is reflected by a crop shows a relatively high value in the green wavelength range, as compared to the spectrum of sunlight that is reflected from the soil surface. As a result, the crop color generally contains plenty of green components, and thus a typical example of the "color of the crop row" is green. However, as will be described below, the "color of the crop row" is not limited to green.

The image sensor in the imaging device 120 includes a multitude of photodetection cells that are arranged in rows and columns. Each individual photodetection cell corresponds to one of the pixels that define an image, and includes an R subpixel to detect the intensity of red light, a G subpixel to detect the intensity of green light, and a B subpixel to detect the intensity of blue light. The light outputs to be detected by the R subpixel, the G subpixel, and the B subpixel of each photodetection cell may be referred to as an R value, a G value, and a B value, respectively. Hereinafter, an R value, a G value, and a B value may be collectively referred to as "pixel values" or "RGB values". By using an R value, a G value, and a B value, it is possible to define a color based on coordinate values within an RGB color space.

In the case where the color of a crop row for detection is green, an enhanced image in which the color of a crop row is enhanced is an image resulting from converting the RGB values of each pixel of a color image acquired by the imaging device into pixel values having a relatively large weight on the G value. Such pixel value conversion to generate an enhanced image may be defined as "(2×G value−R value−B value)/(R value+G value+B value)", for example. Herein, the (R value+G value+B value) in the denominator is a factor for normalization. Hereinafter, normalized RGB values will be referred to as rgb values, which are defined as: r=R value/(R value+G value+B value); g=G value/(R value+G value+B value); and b=B value/(R value+G value+B value). Note that "2×g−r−b" is called an excess green index (ExG: Excess Green Index).

Figure 10:
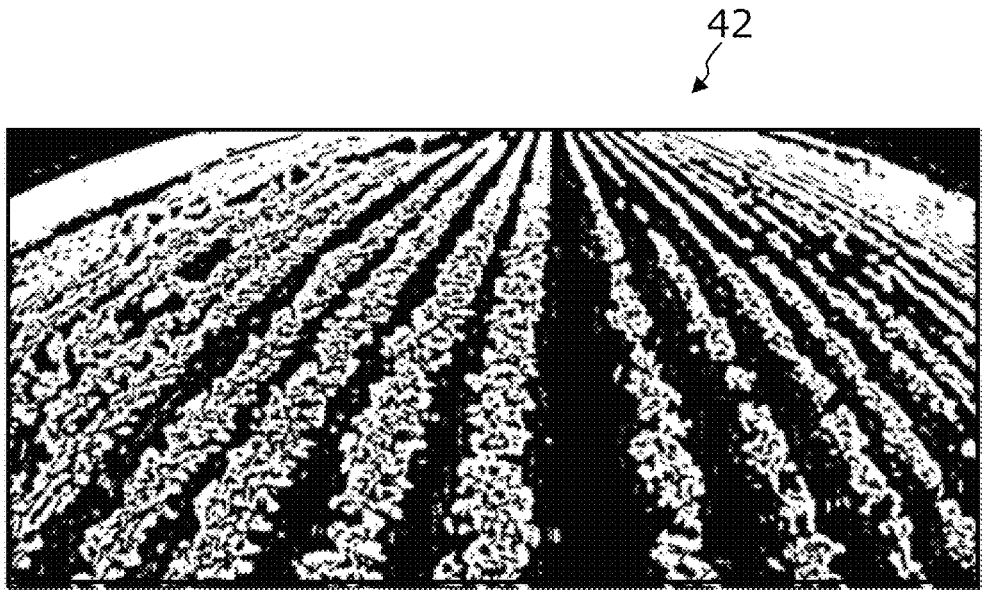
FIG. 10 is a diagram showing an enhanced image resulting from converting the RGB values of one frame of image among time-series color images RGB values into an excess green index (ExG=2×g−r−b).

FIG. 10 is a diagram showing an enhanced image 42 resulting from converting the RGB values of the image of FIG. 9 into "2×g−r−b". Through this conversion, in the image 42 of FIG. 10, any pixel whose "r+b" is smaller than g is displayed brighter, and any pixel whose "r+b" is larger than g is displayed darker. Through this conversion, an image (enhanced image) 42 in which the color of a crop row for detection (i.e., "green" in this example) is enhanced is obtained. Any pixel which is relatively bright in the image of FIG. 10 is a pixel having a relatively large green component, and belongs to the crop region.

As the "color index value" regarding which the color of the crop is to be enhanced, any index other than the excess green index (ExG) may also be used, e.g., a green red vegetation index (G value-R value)/(G value+R value). In the case where the imaging device can also function as an infrared camera, NDVI (Normalized Difference Vegetation Index) may be used as the "color index value for the crop row".

There may be cases where each crop row is covered by a sheet called "mulch" (mulching sheet). In such cases, the "color of the crop row" is the "color of objects that are arranged in rows covering the crops". Specifically, when the sheet color is black, which is an achromatic color, the "color of the crop row" means "black". When the sheet color is red, the "color of the crop row" means "red". Thus, the "color of the crop row" may mean not only the color of the crops themselves, but also the color of the region defining the crop row (i.e., a color that is distinguishable from the color of the soil surface).

The generation of an enhanced image in which the "color of the crop row" is enhanced may utilize conversion from an RGB color space into an HSV color space. An HSV color space is a color space including the three components of hue, saturation, and value. Using color information obtained by converting from an RGB color space into an HSV color space makes it possible to detect a "color" with low saturation, such as black or white. In the case of utilizing an OpenCV library to detect "black", the hue may be set to the maximum range (0-179), the saturation may be set to the maximum range (0-255), and the value range may be set to 0-30. In order to detect "white", the hue may be set to the maximum range (0-179), the saturation may be set to the maximum range (0-255), and the value range may be set to 200-255. Any pixel that has a hue, a saturation, and a value falling within such setting ranges is a pixel having the color to be detected. In the case of detecting a green pixel, for example, the hue range may be set to a range of, e.g., 30-90.

Generating an image in which the color of a crop row for detection is enhanced (enhanced image) makes it easy to distinguish (i.e., extract) crop row regions from the remaining background regions (segmentation).

Next, operation S2 will be described.

In operation S2, from the enhanced image 42, the processing device 122 generates a plan view image being classified into first pixels of which a color index value for the crop row is equal to or greater than a threshold and second pixels of which this index value is below the threshold. The plan view image is an image as viewed from above the ground surface.

Figure 11:
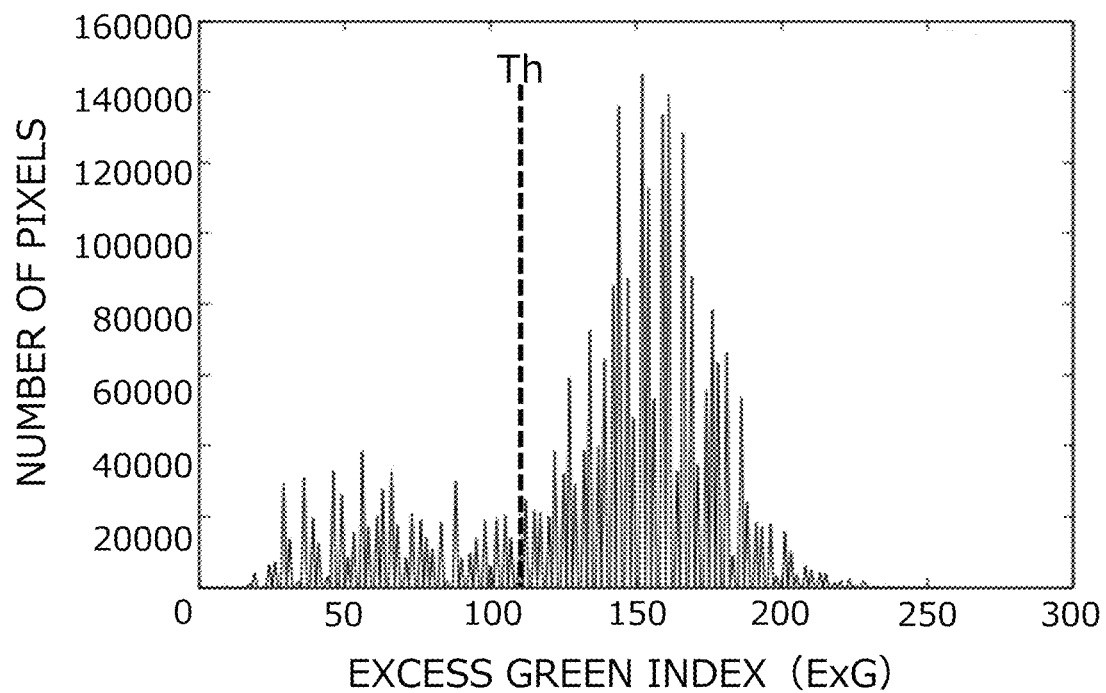
FIG. 11 is a histogram of an excess green index (ExG) in the image of FIG. 10.

In the present preferred embodiment, as a color index value for the crop row, the aforementioned excess green index (ExG) is adopted, and a discriminant analysis method (Otsu's binarization) is used to determine a discrimination threshold. FIG. 11 is a histogram of an excess green index (ExG) in the enhanced image 42 of FIG. 10. In the histogram, the horizontal axis represents the excess green index (ExG), and the vertical axis represents the number of pixels in the image (corresponding to frequency of occurrence). In FIG. 11, a broken line is shown indicating a threshold Th that is calculated by the discriminant analysis algorithm. Against this threshold Th, the pixels in the enhanced image 42 are classified into two classes. The right side of the broken line indicating the threshold Th shows the frequency of occurrence of pixel with an excess green index (ExG) equal to or greater than the threshold, these pixels being estimated as belonging to a crop class. On the other hand, the left side of the broken line indicating the threshold Th shows the frequency of occurrence of pixels with an excess green index (ExG) below the threshold, these pixels being estimated as belonging to a non-crop class, e.g., the soil. In this example, the first pixels, i.e., the pixels whose index value is equal to or greater than the threshold, correspond to "crop pixels". On the other hand, the second pixels, whose index value is below the threshold, correspond to "background pixels". The background pixels correspond to objects other than those for detection, e.g., the soil surface, and the aforementioned intermediate regions (work paths) 14 may be defined by background pixels. Note that the method of threshold determination is not limited to the above examples. For example, other methods utilizing machine learning may be used to determine the threshold.

By assigning each of the pixels of the enhanced image 42 as either a "first pixel" or a "second pixel", it becomes possible to extract a region for detection from the enhanced image 42. Also, by giving "zero" to the pixel value of any "second pixel", or removing the second pixel data from the image data, it becomes possible to mask any region other than the regions for detection. When finalizing the regions to be masked, it may be possible to perform a process of including any pixel whose excess green index (ExG) exhibits a locally high value, as a noise, into the masked regions.

Figure 12:
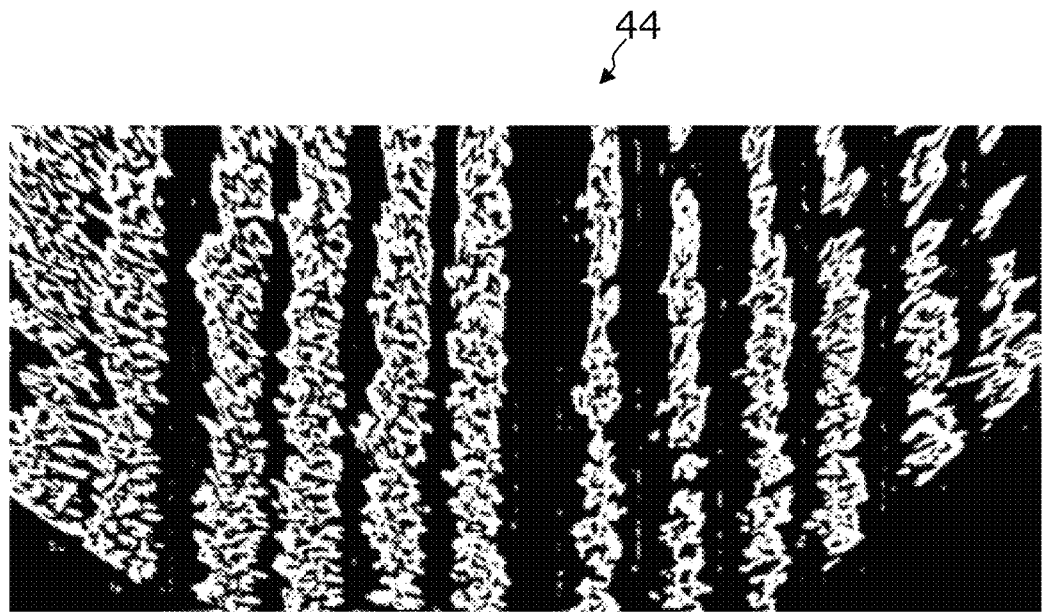
FIG. 12 is a diagram showing an example of a plan view image (overhead view image) being classified into first pixels (e.g., crop pixels) and second pixels (background pixels).

FIG. 12 is a diagram showing an example of a plan view image 44 being classified into first pixels and second pixels, as viewed from above the ground surface. The plan view image 44 of FIG. 12 is an image that is generated from the enhanced image 42 of FIG. 10 by an image transformation technique described below. In the plan view image 44, the second pixels with a color index value for the crop row (which in this example is the excess green index) is below the threshold Th are black pixels (pixels whose value is set to zero). The regions including second pixels are mainly regions where the surface of the soil on the ground surface is visible. In the plan view image 44 of FIG. 12, black triangular regions exist at right and left corners which are tangent to the bottom side. These triangular regions correspond to regions which do not appear in the enhanced image 42 of FIG. 10. Note that, in the image 40 of FIG. 9 and the enhanced image 42 of FIG. 10, a phenomenon where lines that would actually be straight lines are distorted in peripheral portions of the image is observed. Such image distortion is ascribable to the performance of the camera lenses, and may be corrected by using internal parameters of the camera. Processes such as enhancement of the crop regions, masking, and distortion correction may be referred to as preprocessing. The preprocessing may also include processes other than these processes.

The plan view image 44 of FIG. 12 is an overhead view image in which a reference plane Re that is parallel to the ground surface is viewed directly from above along the normal direction of the reference plane Re. This overhead view image can be generated from the enhanced image 42 of FIG. 10 through homography transformation (planar perspective projection). Homography transformation is a kind of geometric transformation where a point that is on a given plane in a three-dimensional space can be converted to a point that is on another arbitrary plane.

Figure 13:
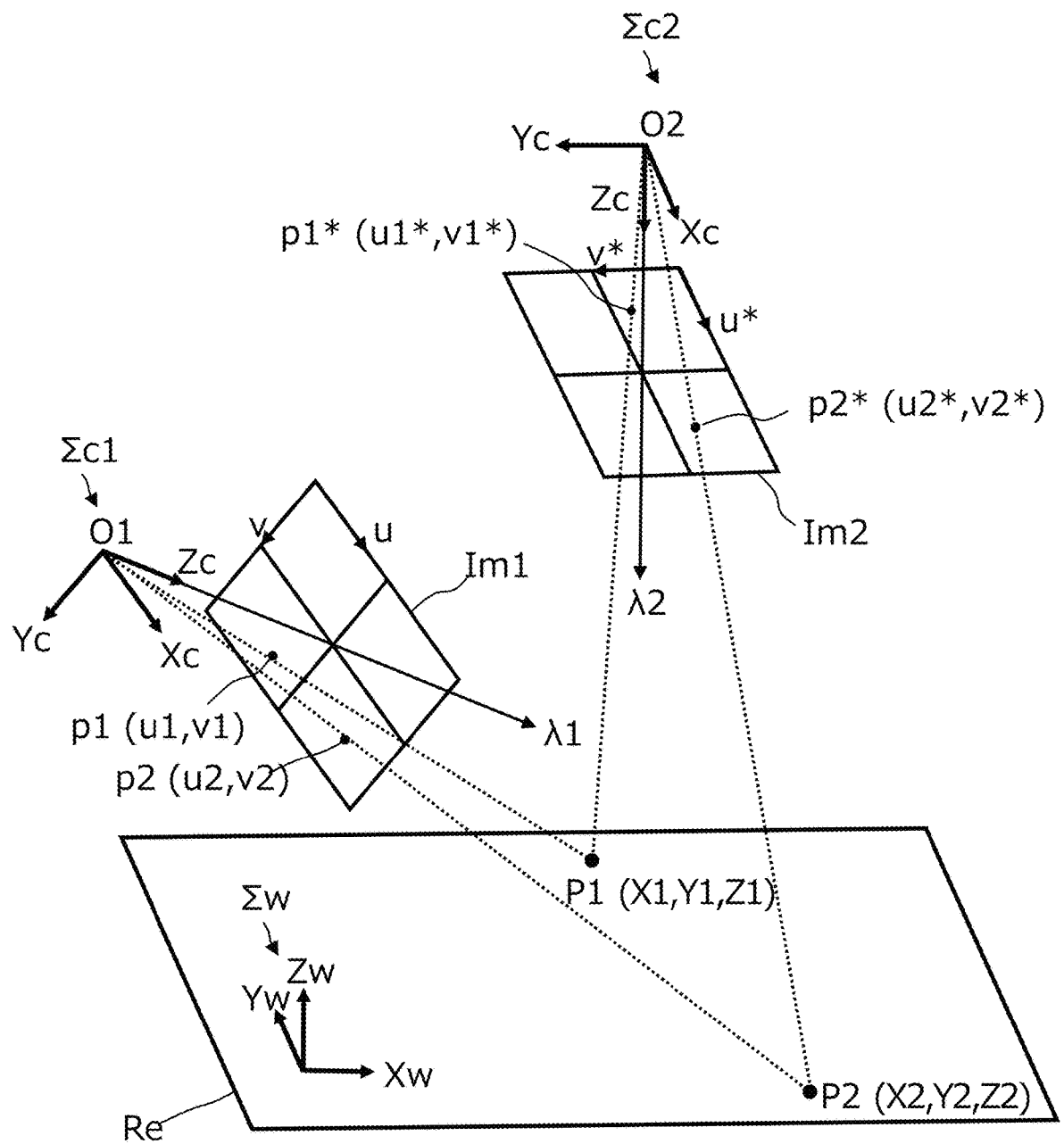
FIG. 13 is a perspective view schematically showing the relative locations between each of a camera coordinate system Σc1 and a camera coordinate system Σc2, and a reference plane Re.

FIG. 13 is a perspective view schematically showing the relative locations between each of a camera coordinate system $\Sigma c1$ of an imaging device that has a first pose (position and orientation) and a camera coordinate system $\Sigma c2$ of an imaging device that has a second pose, and the reference plane Re. In the illustrated example, the camera coordinate system $\Sigma c1$ is inclined so that its Zc axis obliquely intersects the reference plane Re. An imaging device (camera) having the first pose corresponds to an imaging device (camera) that is mounted to the agricultural machine. On the other hand, the camera coordinate system $\Sigma c2$ has its Zc axis lying orthogonal to the reference plane Re. Stated otherwise, the camera coordinate system $\Sigma c2$ is placed in a state that allows to acquire an overhead view image in which the reference plane Re is viewed directly from above along the normal direction of the reference plane Re.

At a position that is distant from an origin O1 of the camera coordinate system $\Sigma c1$ by the focal length of the camera along the Zc axis, an imaginary image plane Im1 exists. The image plane Im1 is orthogonal to the Zc axis and the camera optical axis $\lambda 1$. A pixel position on the image plane Im1 is defined by an image coordinate system having a u axis and a v axis that are orthogonal to each other. For example, a point P1 and a point P2 located on the reference plane Re may have coordinates (X1, Y1, Z1) and (X2, Y2, Z2) in the world coordinate system $\Sigma w$, respectively. In the example of FIG. 13, the Xw axis and the Yw axis of the world coordinate system $\Sigma w$ are on the reference plane Re.

Therefore, Z1=Z2=0. The reference plane Re is set so as to expand along the ground surface.

Through perspective projection based on a pinhole camera model, the point P1 and the point P2 on the reference plane Re are converted, respectively, into a point p1 and a point p2 on the image plane Im1 of the imaging device having the first pose. On the image plane Im1, the point p1 and the point p2 are at pixel positions indicated by coordinates (u1, v1) and (u2, v2), respectively.

When the imaging device has the second pose, an imaginary image plane Im2 exists at a position that is distant from an origin O2 of the camera coordinate system Σc2 by the focal length of the camera along the Zc axis. In this example, the image plane Im2 is parallel to the reference plane Re. A pixel position on the image plane Im2 is defined by an image coordinate system having a u* axis and a v* axis that are orthogonal to each other. Through perspective projection, a point P1 and a point P2 on the reference plane Re are converted, respectively, into a point p1* and a point p2* on the image plane Im2. On the image plane Im2, the point p1* and point p2* are at pixel positions indicated by coordinates (u1*, v1*) and (u2*, v2*), respectively.

Once the relative locations of the camera coordinate systems Σc1 and Σc2 with respect to the reference plane Re (world coordinate system Σw) are given, then, for a given point (u, v) on the image plane Im1, it is possible to determine a corresponding point (u*, v*) on the image plane Im2 through homography transformation. When point coordinates are expressed by a homogeneous coordinate system, such homography transformation is defined by a transformation matrix H of 3 rows×3 columns.

$$\begin{pmatrix} u^* \\ v^* \\ 1 \end{pmatrix} = H \begin{pmatrix} u \\ v \\ 1 \end{pmatrix} \quad [\text{eq. 1}]$$

The content of the transformation matrix H is defined by numerical values of $h_{11}$, $h_{12}$, ..., $h_{32}$, as indicated below.

$$\begin{pmatrix} u^* \\ v^* \\ 1 \end{pmatrix} = \begin{pmatrix} h11 & h12 & h13 \\ h21 & h22 & h23 \\ h31 & h32 & 1 \end{pmatrix} \begin{pmatrix} u \\ v \\ 1 \end{pmatrix} \quad [\text{eq. 2}]$$

The eight numerical values ($h_{11}$, $h_{12}$, ..., $h_{32}$) can be calculated by a known algorithm once a calibration board that is placed on the reference plane Re is imaged by the imaging device 120 mounted to the agricultural machine 100.

When a point on the reference plane Re has coordinates (X, Y, 0), the coordinates of the corresponding points on the respective camera image planes Im1 and Im2 are associated with the point (X, Y, 0) by respective homography transformation matrices H1 and H2, as indicated by the formulae of eq. 3 and eq. 4 below.

$$\begin{pmatrix} u \\ v \\ 1 \end{pmatrix} = H1 \begin{pmatrix} X \\ Y \\ 1 \end{pmatrix} \quad [\text{eq. 3}]$$

$$\begin{pmatrix} u^* \\ v^* \\ 1 \end{pmatrix} = H2 \begin{pmatrix} X \\ Y \\ 1 \end{pmatrix} \quad [\text{eq. 4}]$$

From the above two formulae, the following formula is derived. As is clear from this formula, the transformation matrix H is equal to $H2H1^{-1}$. $H1^{-1}$ is an inverse of H1.

$$\begin{pmatrix} u^* \\ v^* \\ 1 \end{pmatrix} = H2H1^{-1} \begin{pmatrix} u \\ v \\ 1 \end{pmatrix} \quad [\text{eq. 5}]$$

The content of the transformation matrices H1 and H2 depends on the reference plane Re. Therefore, if the position of the reference plane Re changes, the content of the transformation matrix H also changes.

By utilizing such homography transformation, a plan view image of the ground surface can be generated from an image of the ground surface acquired by the imaging device having the first pose (imaging device mounted to the agricultural machine). In other words, through homography transformation, coordinates of a given point on the image plane Im1 of the imaging device 120 can be converted into coordinates of a point that is on the image plane Im2 of an imaginary imaging device having a predetermined pose with respect to the reference plane Re.

After calculating the content of the transformation matrix H, the processing device 122 executes a software program based on the aforementioned algorithm to generate, from time-series color images or preprocessed images of time-series color images, overhead view images in which the ground surface 10 is viewed from above.

In the above description, it is assumed that points (e.g., P1, P2) in a three-dimensional space are all located on the reference plane Re (e.g., Z1=Z2=0). In the case where the height of a crop with respect to the reference plane Re is non-zero, in the plan view image resulting after homography transformation, the position of a corresponding point will be shifted from its proper position. In order to reduce or prevent an increase in the amount of shift, it is desirable that the height of the reference plane Re is close to the height of the crop for detection. Bumps and dents, e.g., ridges, furrows, or trenches, may exist on the ground surface 10. In such cases, the reference plane Re may be offset upward from the bottoms of such bumps and dents. The offset distance may be appropriately set depending on the bumps and dents of the ground surface 10 on which crops are planted.

While the agricultural machine 100 is traveling on the ground surface 10, if the vehicle body 110 (see FIG. 1) undergoes a roll or pitch motion, the pose of the imaging device 120 changes, whereby the content of the transformation matrix H1 may change. In such a case, angles of rotation of roll and pitch of the vehicle body 110 may be measured with an IMU, and the transformation matrix H1 and the transformation matrix H can be corrected in accordance with the changes in the pose of the imaging device.

By the above-described method, the processing device 122 (processor) according to the present preferred embodiment is configured or programmed to generate a plan view image as viewed from above the ground surface, the plan view image being classified into first pixels of which a color index value for the crop row is equal to or greater than a threshold and second pixels of which this index value is below the threshold. Thereafter, the processing device 122 performs operation S3.

Next, operation S3 will be described.

In operation S3, based on the index values of the first pixels, the processing device 122 determines the positions of the edge lines of the crop row. Specifically, the index values of the first pixels (i.e., pixels whose color index value is equal to or greater than a threshold) are totaled along a plurality of scanning lines in the plan view image.

Figure 14:
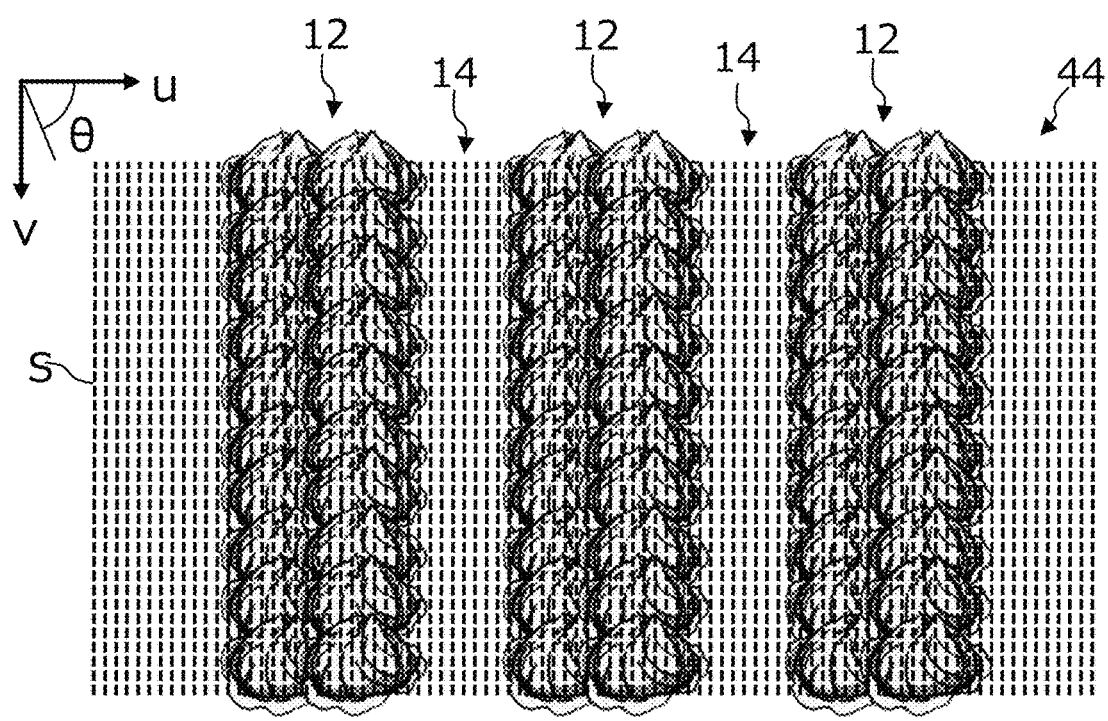
FIG. 14 is a schematic diagram showing an example in which the direction of crop rows in a plan view image and the direction of scanning lines are parallel.

FIG. 14 is an example of a plan view image 44 in which three crop rows 12 appear. In this example, the directions of the crop rows 12 are parallel or substantially parallel to the vertical direction in the image (v axis direction). FIG. 14 shows a multitude of scanning lines (broken line) S that are parallel to the vertical direction in the image (v axis direction). The processing device 122 totals the index values of pixels that are located on the plurality of scanning lines S to obtain a total value for each scanning line S.

Figure 15:
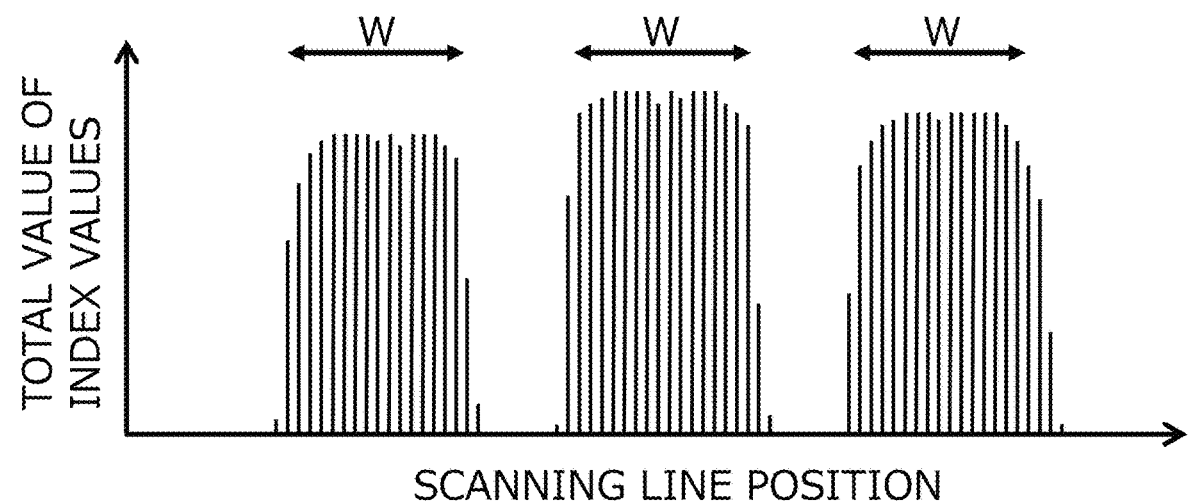
FIG. 15 is a diagram schematically showing an example of a total value histogram, as obtained with respect to the plan view image of FIG. 14.

FIG. 15 is a diagram schematically showing a relationship between positions of scanning lines S and total values of index values (histogram of total values), as obtained with respect to the plan view image of FIG. 14. In FIG. 15, the horizontal axis represents the positions of scanning lines S along the horizontal direction in the image (u axis direction). In the plan view image 44, when many of the pixels that are crossed by a scanning line S are first pixels belonging to a crop row 12, that scanning line S has a large total value. On the other hand, when many of the pixels that are crossed by a scanning line S are second pixels (background pixels) belonging to an intermediate region (work path) 14 existing between crop rows 12, that scanning line S has a small total value. Note that, in the present preferred embodiment, the intermediate regions (work paths) 14 are masked, so that the second pixels have an index value of zero.

In the histogram of FIG. 15, there exist concave regions whose total value is zero or near-zero, and convex regions that are distinguished by such concave regions. The concave regions correspond to intermediate regions (work paths) 14, whereas the convex regions correspond to crop rows 12. In the present preferred embodiment, the positions of scanning lines S having total values at predetermined positions on opposite sides of a peak of total values within a convex region, specifically, those which accounts for a predetermined rate (e.g., a value chosen in a range from 60% to 90%) with respect to the peak of total values, are determined as the positions of edge lines of a crop row 12. Both ends of an arrow W in FIG. 15 indicate the positions of edge lines of each crop row 12. In the example of FIG. 15, the positions of the edge lines of each crop row 12 are positions of scanning lines S having a 80% value of a peak of total values of the crop row 12, for example.

In the present preferred embodiment, the second pixels are masked before color index values for the crop row is totaled upon each scanning line S. In other words, it is not that the number of first pixels (number of pixels) is counted in a plan view image that has been binarized based on a classification between first pixels and second pixels. In the case where the number of first pixels is counted, if a multitude of pixels (classified as first pixels) that slightly exceed the threshold Th due to fallen leaves and weeds or the like exist, for example, the count value of first pixels will increase. On the other hand, as in the present preferred embodiment of the present disclosure, totaling color index values for the crop row with respect to first pixels, rather than relying on the number of first pixels, reduces or prevents misjudgments associated with fallen leaves or weeds, thus improving the robustness of crop row detection.

Figure 16:
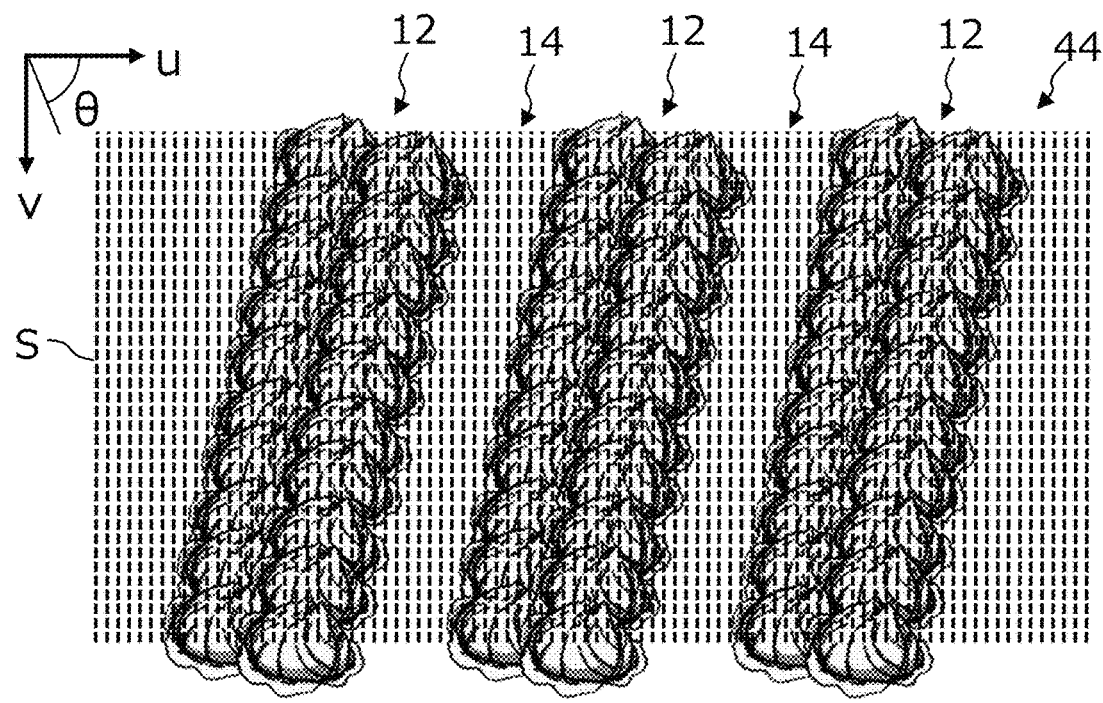
FIG. 16 is a schematic diagram showing an example where the direction of crop rows and the direction of scanning lines intersect in a plan view image.

FIG. 16 shows an example of a plan view image 44 in which crop rows 12 extend obliquely. As has been described with reference to FIG. 3 and FIG. 4, depending on the orientation of the agricultural machine 100, the crop rows 12 may extend in directions that are inclined right or left in the image 40 acquired by the imaging device 120. If the plan view image 44 is generated from such an image through homography transformation, as in the example of FIG. 16, the direction of the crop rows 12 will be inclined from the vertical direction in the image (v axis direction).

Figure 17:
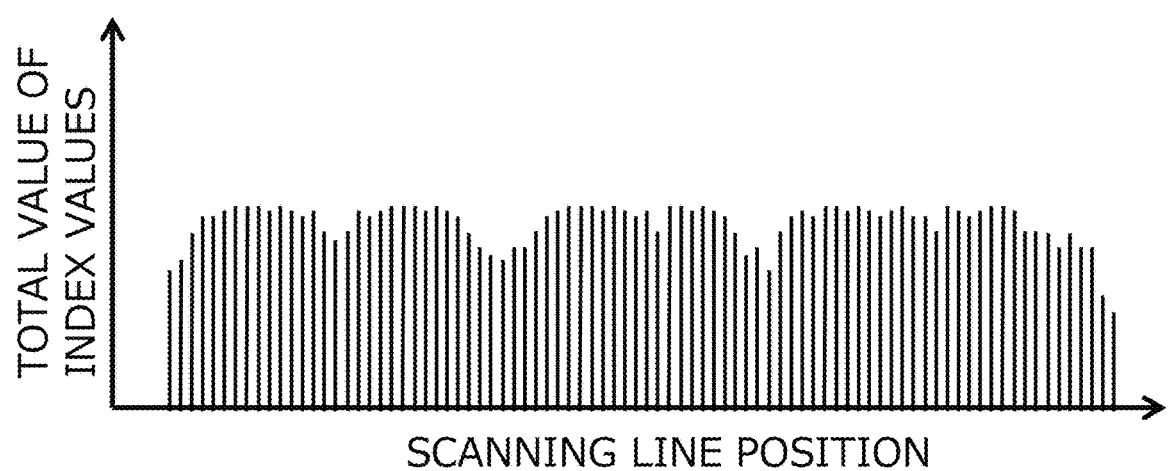
FIG. 17 is a diagram schematically showing an example of a total value histogram, as obtained with respect to the plan view image of FIG. 16.

FIG. 16 also shows a multitude of scanning lines (broken line) S that are parallel or substantially parallel to the vertical direction in the image (v axis direction). When the processing device 122 totals the index values of pixels that are located on such a plurality of scanning lines S to obtain a total value for each scanning line S, a histogram of total values as shown in FIG. 17 may result. FIG. 17 is a diagram schematically showing a relationship between positions of scanning lines S and total values of index values, as obtained with respect to the plan view image of FIG. 16. From this histogram, edge lines of the crop rows 12 cannot be determined.

Figure 18:
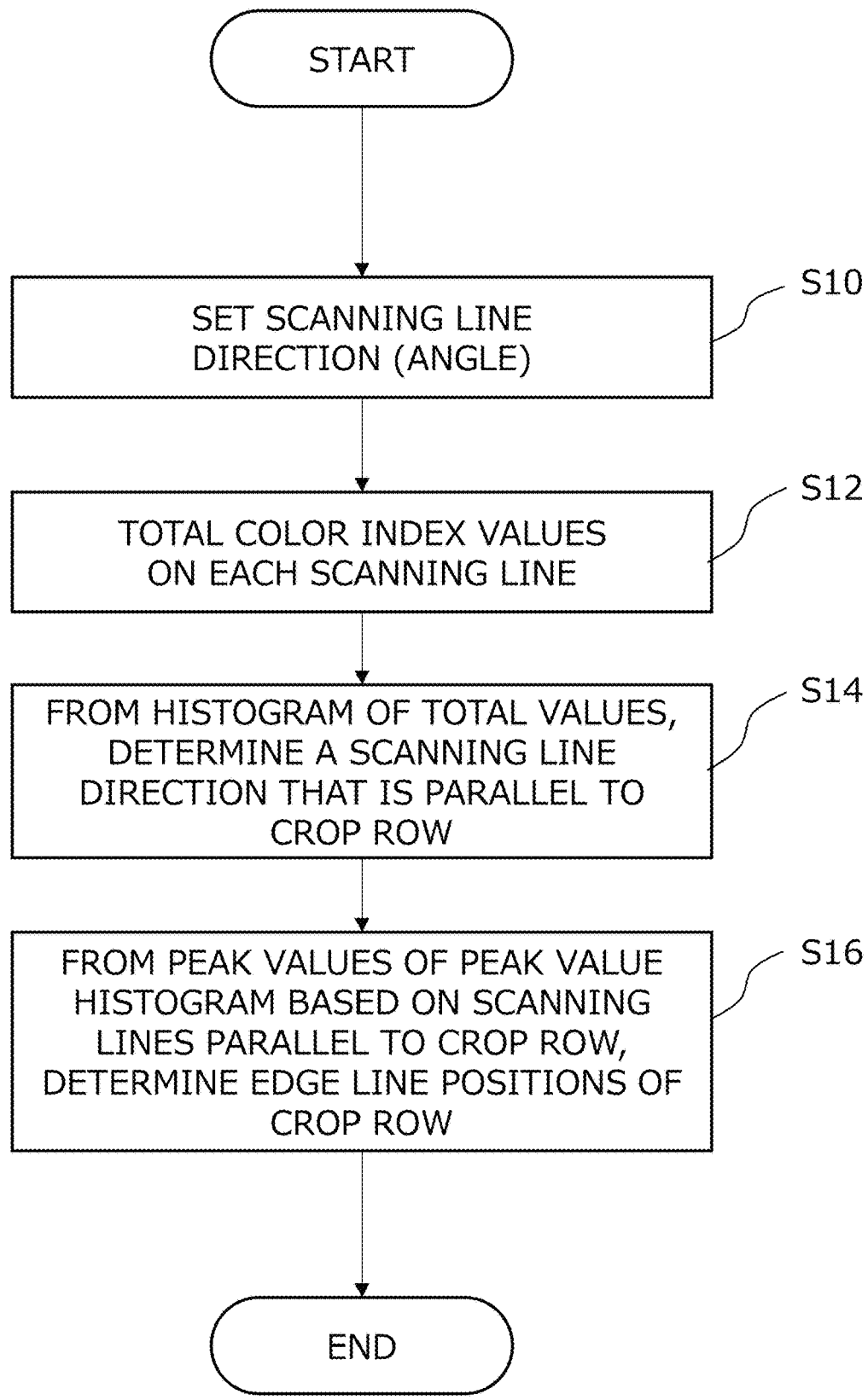
FIG. 18 is a flowchart showing an example algorithm by which a processing device in a preferred embodiment of the present disclosure determines edge lines of a crop row.

FIG. 18 is a flowchart showing an example procedure of varying the direction (angle) of scanning lines S in order to search for a direction (angle) of scanning lines S that is parallel to the direction of the crop rows 12.

At step S10, a direction (angle) of the scanning lines S is set. Herein, clockwise angles θ are defined relative to the u axis of the image coordinate system (see FIG. 14 and FIG. 16). The search through angles θ may be done by setting a range of e.g., 60 to 120 degrees and using angle variations of 1 degree, for example. In this case, at step S1, 60, 61, 62, . . . , 119 and 120 degrees are given as the angle θ of scanning lines S.

At step S12, index values are totaled for the pixels on any scanning line S extending in the direction of each angle θ, thereby generating a histogram of total values. The histogram will exhibit a different distribution depending on the angle θ.

At step S14, from among a plurality of histograms thus obtained, a histogram is selected that has steep boundaries between bumps and dents, e.g., as shown in FIG. 15, such that the crop rows 12 are clearly distinguishable from the intermediate regions 14, and the angle θ of scanning lines S that is conducive to that histogram is determined.

At step S16, from the peak values of the histogram corresponding to the angle θ determined at step S14, edge lines of each crop row 12 are determined. As described above, positions of scanning lines S having a total value that is 0.8 times the peak, for example, may be adopted as the edge lines.

Note that, when searching through directions (angles) of the scanning lines S, each time the angle θ is varied by 1 degree within the range of search, a histogram of total values on the scanning lines S at that angle θ may be generated. A feature (e.g., recess depth/protrusion height, a differential value of the envelope, etc.) may be calculated from the waveform of the histogram, and based on that feature, it may be determined whether the direction of the crop rows 12 is parallel to the direction of the scanning lines S or not.

Note that the method of determining the angle θ is not limited to the above examples. In the case where the direction in which the crop rows extend is known through measurements, the direction of the agricultural machine may be measured with an inertial measurement unit (IMU) mounted on the agricultural machine 100, and its angle θ with respect to the direction in which the crop rows extend may be determined.

Figure 19:
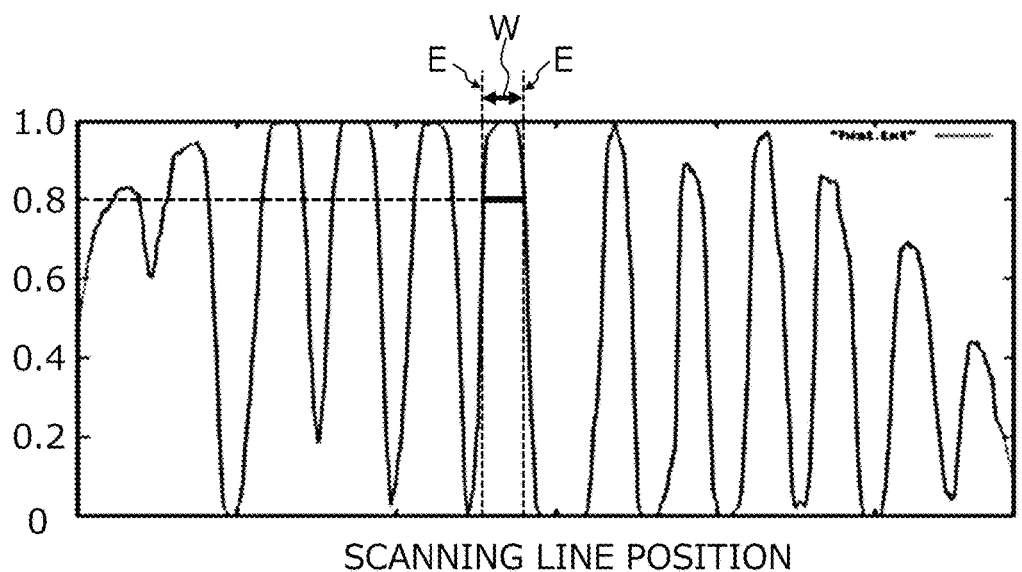
FIG. 19 is a diagram showing a total value histogram obtained from the plan view image of FIG. 12.

FIG. 19 is a diagram showing an example of a total value histogram that is generated by the plan view image of FIG. 12. For a protrusion of the histogram that is located in the center, scanning line positions that are 0.8 times its peak value are determined as the positions of edge lines E, for example. In this histogram, the protrusion peaks become lower and the protrusion peaks become more spread out as the scanning line positions become more distant toward the right and the left from the center. This is because, as is clear from the image of FIG. 12, the image has little distortion at the center of the plan view image, whereas distortion of the image increases away from the center toward the right and the left, and the black triangular regions located at opposite sides of the bottom side cause a decrease in the total values.

When detection of crop rows is utilized for the traveling of the agricultural machine, the crop rows to be accurately detected are at the center of the image or its vicinity. Therefore, distortion in regions near both ends of the right-left direction of the plan view image can be ignored.

Figure 20:
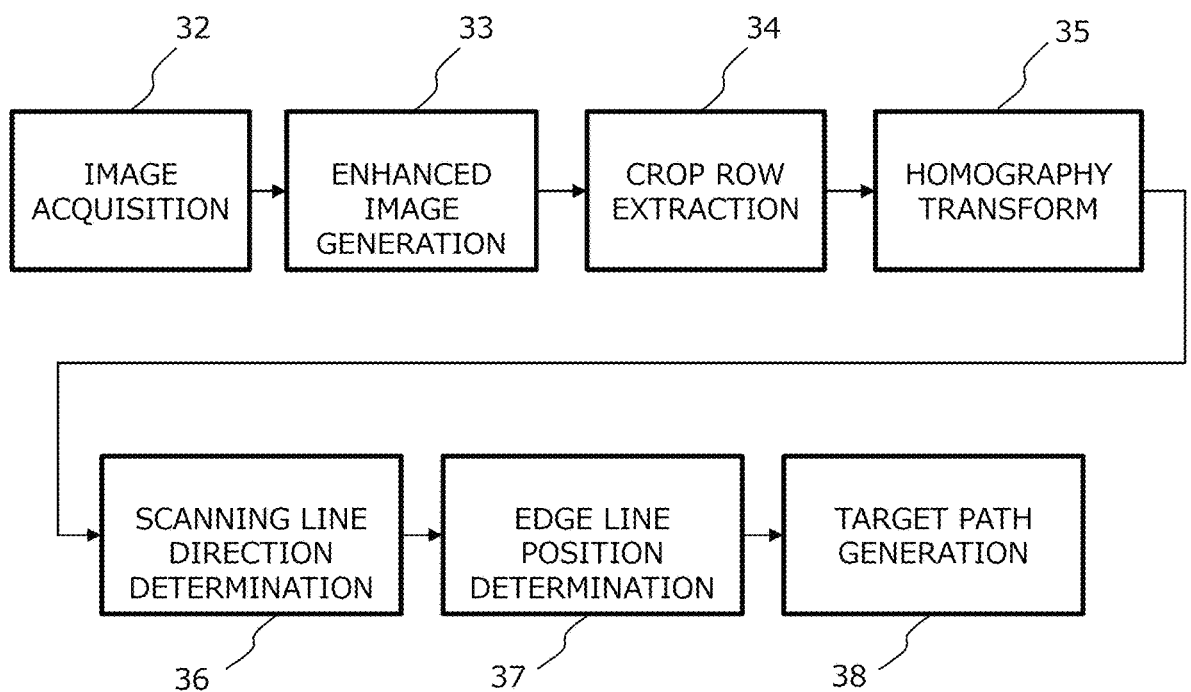
FIG. 20 is a block diagram showing processes that are executed by a processing device according to a preferred embodiment of the present disclosure.

FIG. 20 is a block diagram showing a series of processes that are executed by the processing device 122 (processor) according to the present preferred embodiment. As shown in FIG. 20, by executing an image acquisition 32, an enhanced image generation 33, a crop row extraction 34, and a homography transformation 35, the processing device 122 is able to obtain the plan view image 44 shown in FIG. 16, for example. By further executing a scanning line direction determination 36 and an edge line position determination 37, the processing device 122 is able to obtain the positions of edge lines of the crop rows. Thereafter, the processing device 122, or a path generator that has acquired information indicating the positions of the edge lines from the processing device 122, is able to execute a target path generation 38 for the agricultural machine, on the basis of the edge lines. A target path may be generated such that wheels that are included in the agricultural machine are maintained within an intermediate region (work path) 14 that is interposed between the edge lines E. For example, a target path may be generated such that the central portion along the width direction of any tire passes through the center between two edge lines that are located at both ends of an intermediate region (work path) 14. With such a target path, even if the agricultural machine goes off the target path during travel by about several centimeters, the tires are less likely to go into a crop row.

It has been confirmed that, according to preferred embodiments of the present disclosure, crop row detection with high accuracy is possible by reducing or preventing the influences of forward light, backlight, sunny weather, cloudy weather, fog, and other weather conditions, or daylight conditions that vary depending on the time zone of work. It has also been confirmed that crop row detection with high robustness is possible even when there is a change in the kind of crop (cabbage, broccoli, radish, carrot, lettuce, Chinese cabbage, etc.), growth state (from seedling to fully grown), presence/absence of diseases, presence/absence of fallen leaves or weeds, and soil color.

In the above preferred embodiment, thereafter homography transformation is executed after performing a step of determining a binarization threshold and extracting crop regions based on pixels at a threshold or above. However, the step of extracting crop regions may be performed after homography transformation. Specifically, in the series of processes shown in FIG. 20, the homography transformation 35 may be executed between the enhanced image generation 33 and the crop row extraction 34, or executed between the image acquisition 32 and the enhanced image generation 33.

Hereinafter, a preferred embodiment of another method of crop row detection to be performed by a crop detection system according to an example preferred embodiment of the present disclosure will be described.

Figure 21:
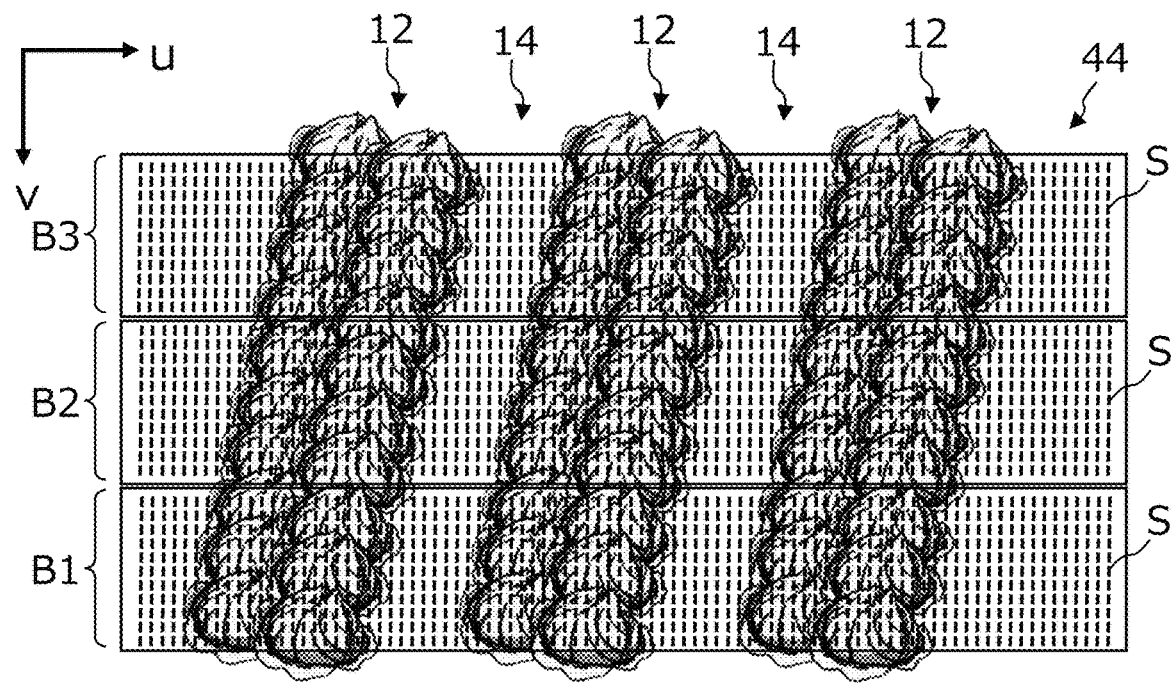
FIG. 21 is a diagram for describing an implementation in which a plan view image is split into a plurality of blocks.

FIG. 21 is a diagram for describing a method which splits an entirety or a portion of the plan view image into a plurality of blocks, and determines the positions of edge lines for each of the plurality of blocks.

In the present preferred embodiment, the processing device 122 splits an entirety or a portion of the plan view image 44 into a plurality of blocks. Then, for each of the plurality of blocks, the positions of edge lines E of crop rows 12 are determined. In the illustrated example, in the plan view image, there are three blocks B1, B2 and B3 in belt shapes that are continuous along the horizontal direction in the image. The processing device 122 is able to determine edge lines of crop rows based on a belt shape in a direction that is different from the traveling direction of the agricultural machine 100.

Figure 22:
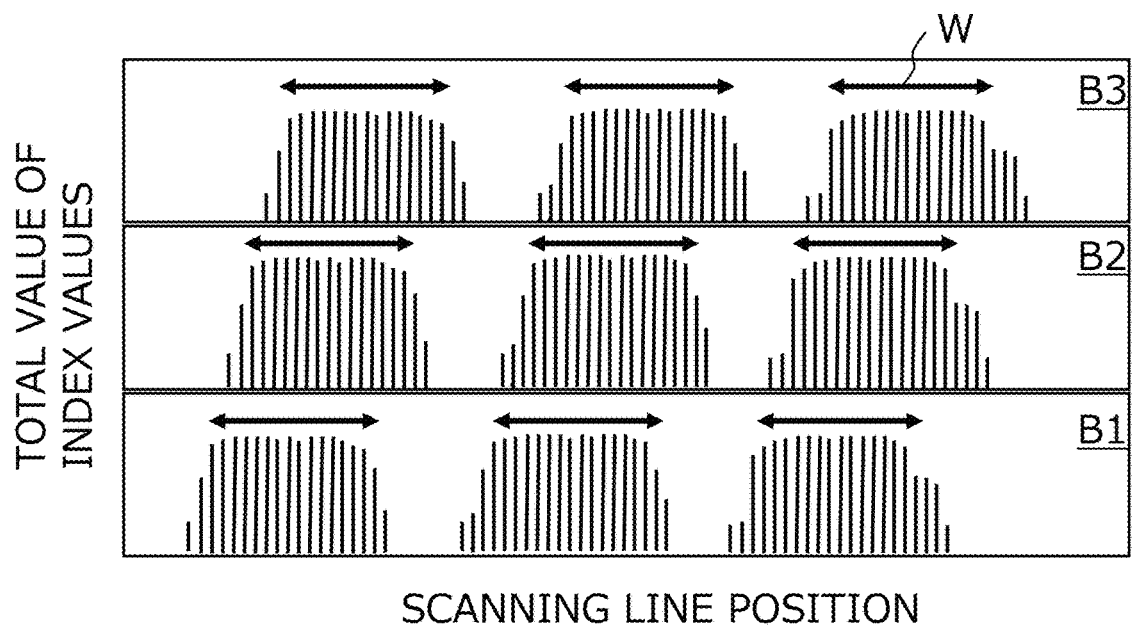
FIG. 22 is a diagram schematically showing a relationship between positions of scanning lines and total values of index values for each of the blocks in FIG. 21.

FIG. 22 is a diagram schematically showing a relationship (total value histogram) between positions of scanning lines S and total values of index values for each of blocks B1, B2 and B3 of the plan view image of FIG. 21. The scanning line S for which to perform totalization is always parallel to the vertical direction in the image. Totalization of index values is performed block by block, and there is no need to change the direction (angle) of the scanning lines S. By reducing the length of the scanning lines S, even if the crop rows 12 extend obliquely, it is possible to appropriately detect regions of the second pixels (background pixels) that are ascribable to the intermediate regions (work paths) 14. This eliminates the need to change the angles of the scanning lines S.

In FIG. 22, both ends of an arrow W indicate the positions of edge lines of a crop row, as determined for each of blocks B1, B2 and B3. In the example shown in FIG. 21, the directions of the crop rows 12 are inclined with respect to the direction of the scanning lines S. Therefore, in the earlier-described case where scanning line positions exhibiting a value that is 0.8 times a peak value of the total value histogram, for example, are adopted as the positions of edge lines E of a crop row 12, the positions of such edge lines E correspond to both ends of a "width" passing near the center of the crop row 12, in each of blocks B1, B2 and B3.

Figure 23:
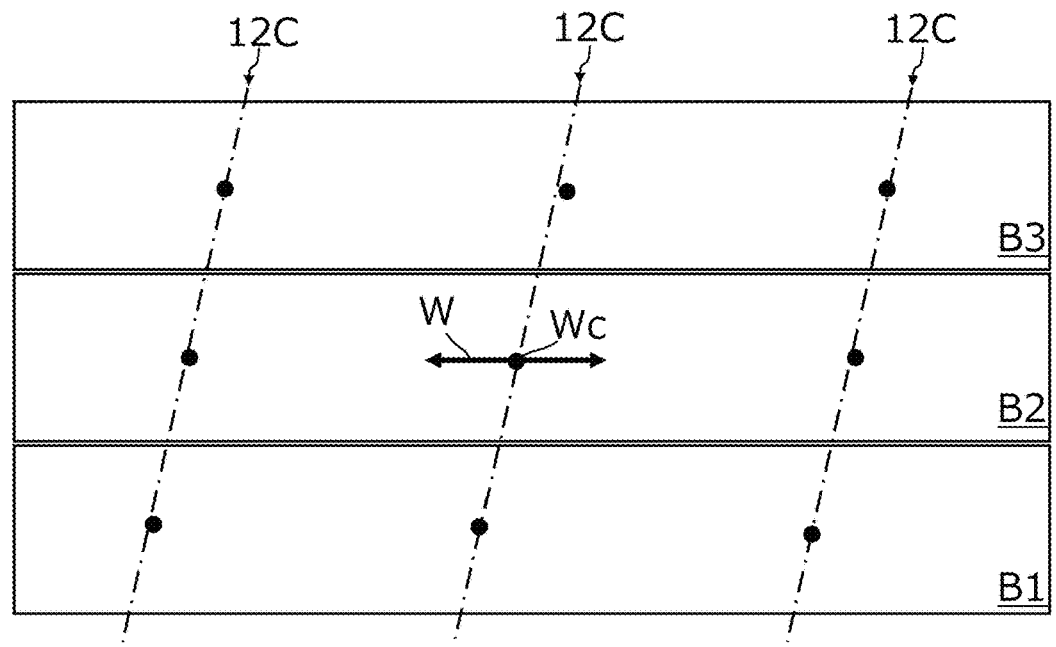
FIG. 23 is a diagram showing an example of crop row centers in each of the blocks in FIG. 22 and approximation lines for the crop row centers.

FIG. 23 shows crop row centers Wc in each of blocks B1, B2 and B3 in FIG. 22. A crop row center Wc is determined from the center of an arrow W that defines the edge lines of a crop row as determined from the total value histogram of FIG. 22, and is located at the center of each block along the vertical direction in the image. FIG. 23 shows examples of approximation line 12C for crop row centers Wc belonging to each identical crop row 12. An approximation line 12C is a straight line that is determined so that a mean square of its distances (errors) from the plurality of crop row centers Wc of each crop row 12 is minimum, for example. Such an approximation line 12C corresponds to a line passing through the center of the crop row 12.

Figure 24:
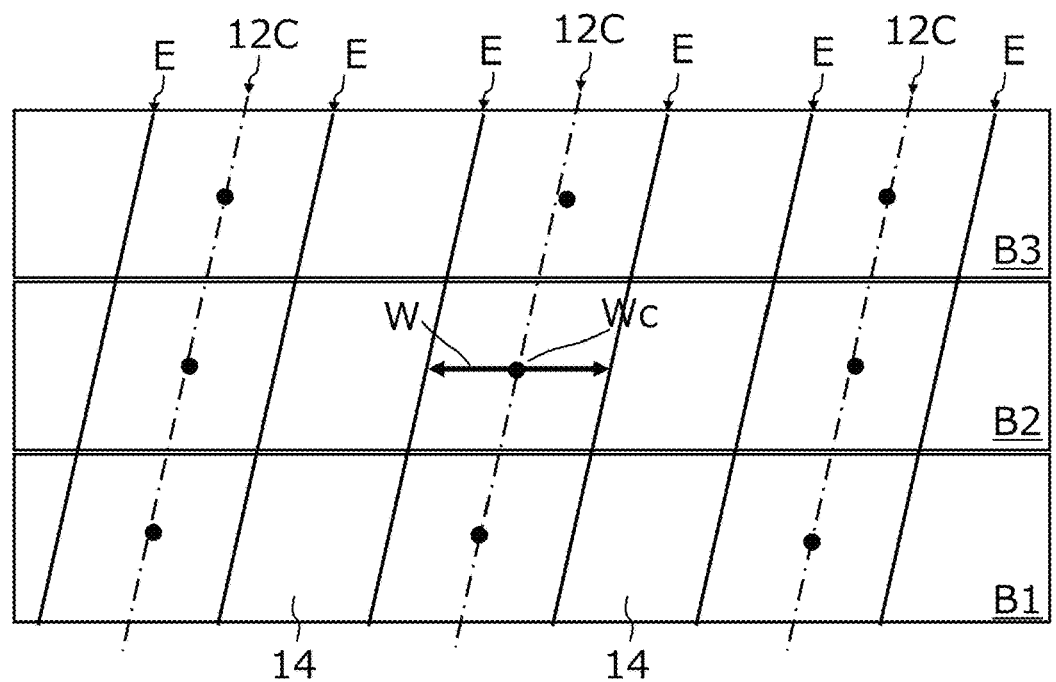
FIG. 24 is a top view showing examples of edge lines of crop rows as determined from the approximation lines in FIG. 23.

FIG. 24 is a top view showing examples of edge lines E of crop rows 12 as determined from the approximation lines 12C in FIG. 23. In this example, two edge lines E that are associated with each crop row 12 have an interval that is equal to the length of an arrow W, and are at equidistant positions from an approximation line 12C.

According to the present preferred embodiment, there is no need to change the directions (angles) of the scanning lines, and the edge lines E of the crop rows 12 can be determined with less computational load. Note that the length of each block along the vertical direction in the image may be set to an equivalent of a distance of 1 to 2 meters on the ground surface, for example. Although the present preferred embodiment splits one image into three blocks to derive total value histograms, the number of blocks may be four or more. The block shape are not limited to the above examples. In the plan view image, the block may be in belt shapes that are continuous along either the horizontal direction in the image or the vertical direction in the image. The processing device 122 is able to determine the edge lines of the crop rows through splitting into blocks of belt shapes extending in a direction that is different from the traveling direction of the agricultural machine 100.

Figure 25:
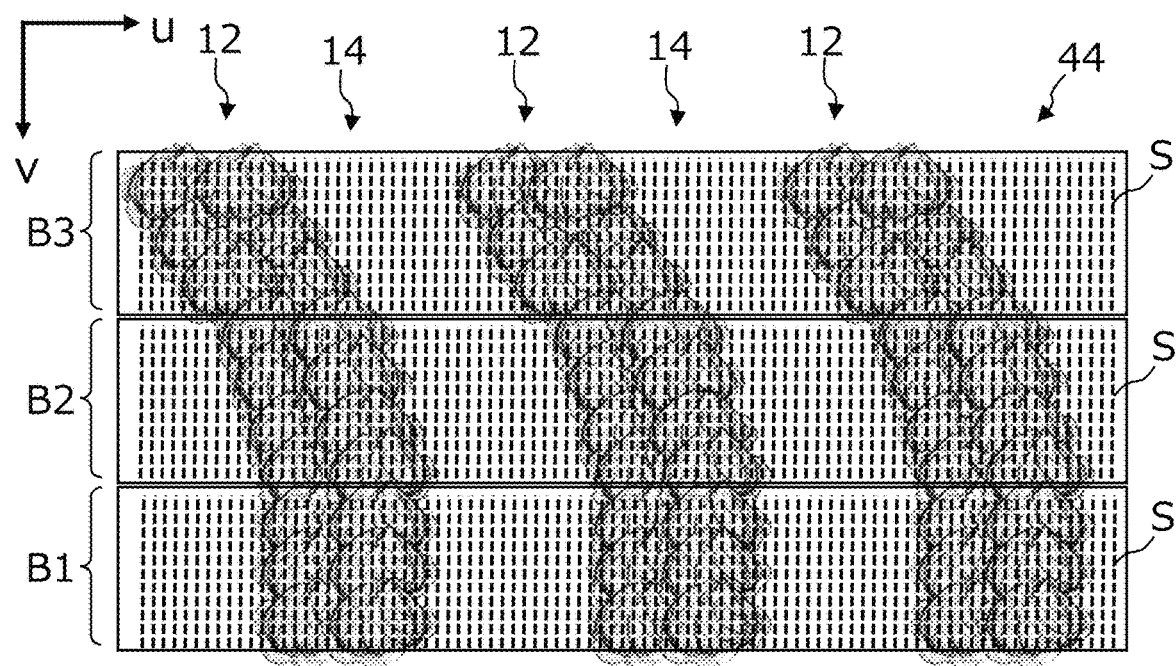
FIG. 25 is a diagram for describing a method which, in the case where crop rows include portions that are bent in curve shapes, splits an entirety or a portion of the plan view image into a plurality of blocks, and determines the positions of edge lines for each of the plurality of blocks.
Figure 26:
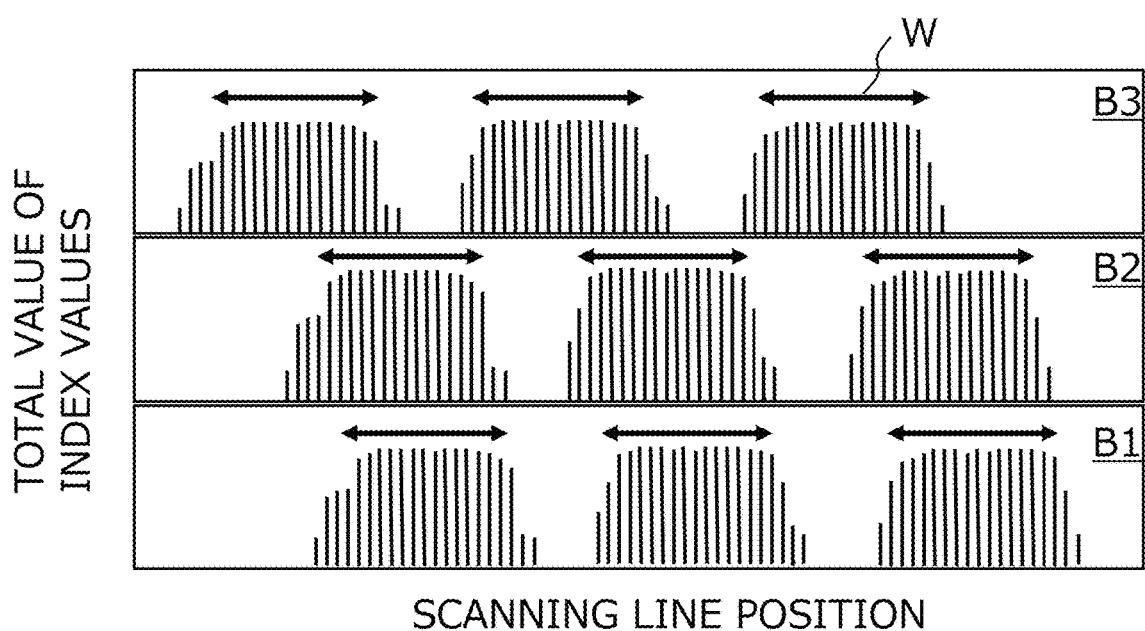
FIG. 26 is a diagram schematically showing a relationship between positions of scanning lines and total values of index values (histogram) for each of the blocks in FIG. 25.

FIG. 25 schematically illustrates the crop rows 12 in the plan view image 44 including portions that are bent in curve shapes. FIG. 26 schematically shows a total value histogram for each of blocks B1, B2 and B3 of the plan view image 44 of FIG. 25.

Figure 27:
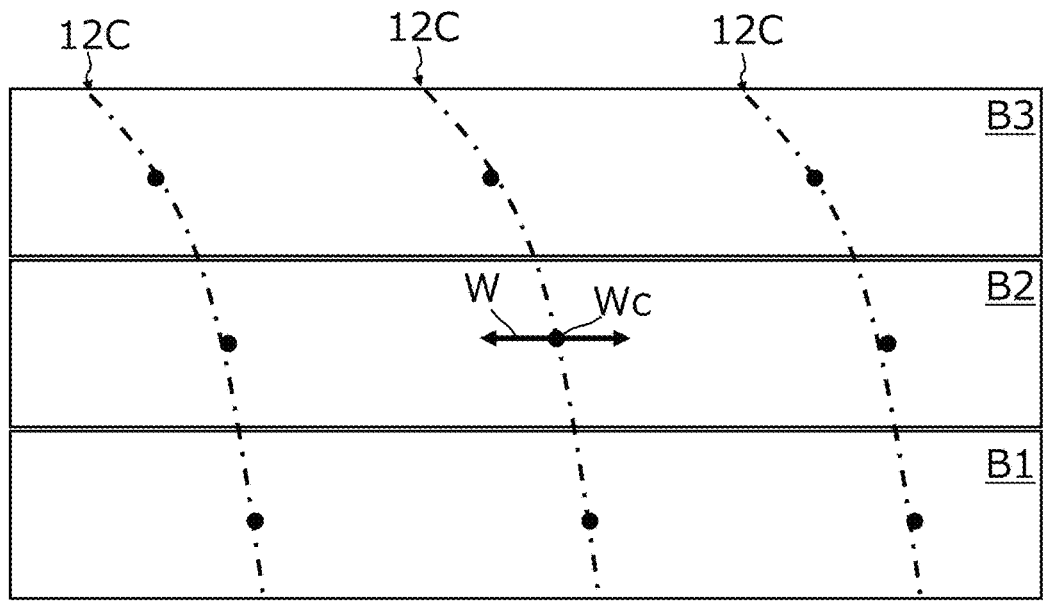
FIG. 27 is a diagram showing an example of crop row centers in each of the blocks in FIG. 26 and approximation lines for the crop row centers.

FIG. 27 is a diagram showing crop row centers Wc in each of blocks B1, B2 and B3 in FIG. 26, and examples of approximation lines 12C for the respective crop row centers Xc. An approximation line 12C in this example is a curve (e.g., a higher-order curve such as a cubic curve) that is derived so that a mean square of its distances (errors) from the crop row centers Wc of each crop row 12 is minimum, for example. Such approximation lines 12C correspond to curved lines which pass through the centers of the crop rows 12 having a curved portion.

Figure 28:
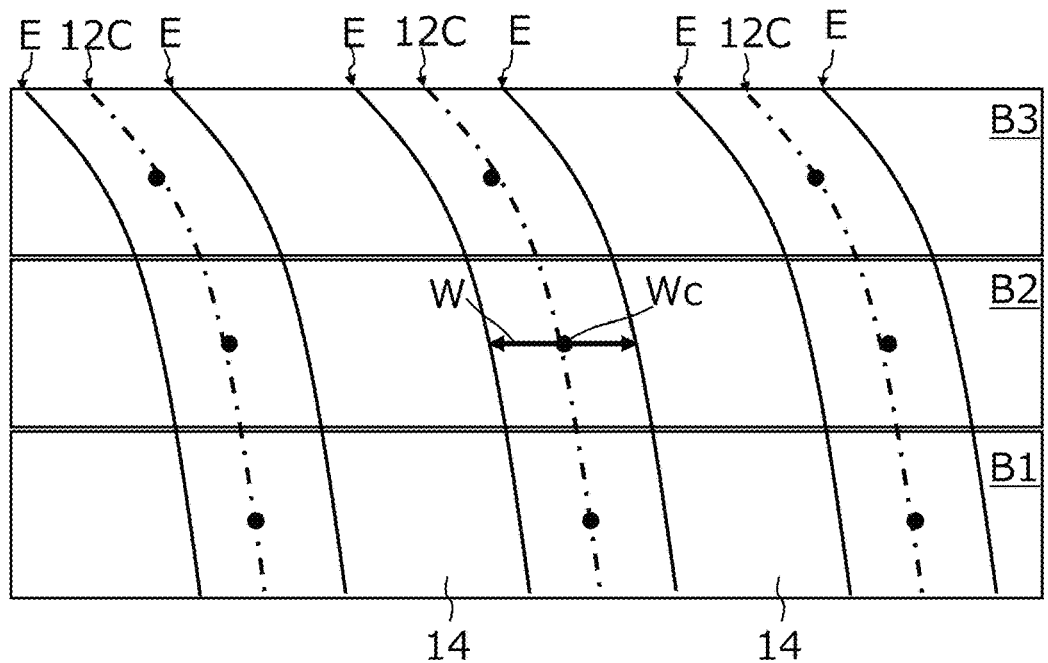
FIG. 28 is a top view showing examples of edge lines of crop rows as determined based on the approximation curves in FIG. 27.

FIG. 28 is a top view showing examples of edge lines E of crop rows 12 as determined from the approximation lines in FIG. 27. The edge lines E are generated by a similar method to the method that has been described with reference to FIG. 24. In other words, two edge lines E that are associated with each crop row 12 have an interval that is equal to the length of an arrow W, and are at equidistant positions from an approximation line 12C.

As described above, by splitting the plan view image into a plurality of blocks and generating a total value histogram for each block, it becomes easy to determine the direction of a crop row, and even if the crop row changes its direction in the middle, it is possible to know the direction after the change.

The above-described methods of crop row detection can all be implemented by a computer, and carried out by causing the computer to execute desired operations, for example.

Preferred Embodiment 2

Next, an agricultural machine including a crop row detection system according to a preferred embodiment of the present disclosure will be described.

An agricultural machine according to the present preferred embodiment includes the above-described crop row detection system. Moreover, this agricultural machine includes a control system (controller) configured or programmed to perform control to achieve auto-steer driving. The control system is a computer system that includes a storage device and a controller, and is configured or programmed to control steering, travel, and other operations of the agricultural machine.

In a usual automatic steering operation mode, the controller is configured or programmed to identify the position of the agricultural machine by using the positioning device, and based on a target path which has been generated in advance, control the steering of the agricultural machine so that the agricultural machine travels along the target path. Specifically, the controller is configured or programmed to control the steering angle of the wheels responsible for steering (e.g., the front wheels) of the agricultural machine so that the work vehicle travels along the target path within the field. The agricultural machine according to the present preferred embodiment includes an automatic steering device (automatic steering controller) configured or programmed to perform not only such a usual automatic steering mode, but also self-driving under "row-following control" within any field in which rows of crops are made.

The positioning device includes a GNSS receiver, for example. Such a positioning device is able to identify the position of the work vehicle based on signals from GNSS satellites. However, when there are crop rows in the field, even if the positioning device is able to measure the position of the agricultural machine with a high accuracy, the interspaces between crop rows are narrow, such that the traveling equipment, e.g., wheels, of the agricultural machine may be liable to protrude into the crop rows depending on how the crops are planted or depending on the state of growth. In the present preferred embodiment, however, the aforementioned crop row detection system can be used to detect actually-existing crop rows and perform appropriate automatic steering. In other words, the automatic steering device (automatic steering controller) included in the agricultural machine preferred embodiment of the present disclosure is configured or programmed to control the steering angle of the wheels responsible for steering based on the positions of the edge lines of a crop row that are determined by the crop row detection system.

Moreover, in the agricultural machine according to the present preferred embodiment, the processing device (processor) of the crop row detection system can monitor the positional relationship between the edge lines of crop rows and the wheels responsible for steering on the basis of time-series color images. By generating a positional error signal from this positional relationship, becomes possible for the automatic steering device of the agricultural machine to appropriately adjust the steering angle so as to reduce the positional error signal.

Figure 29:
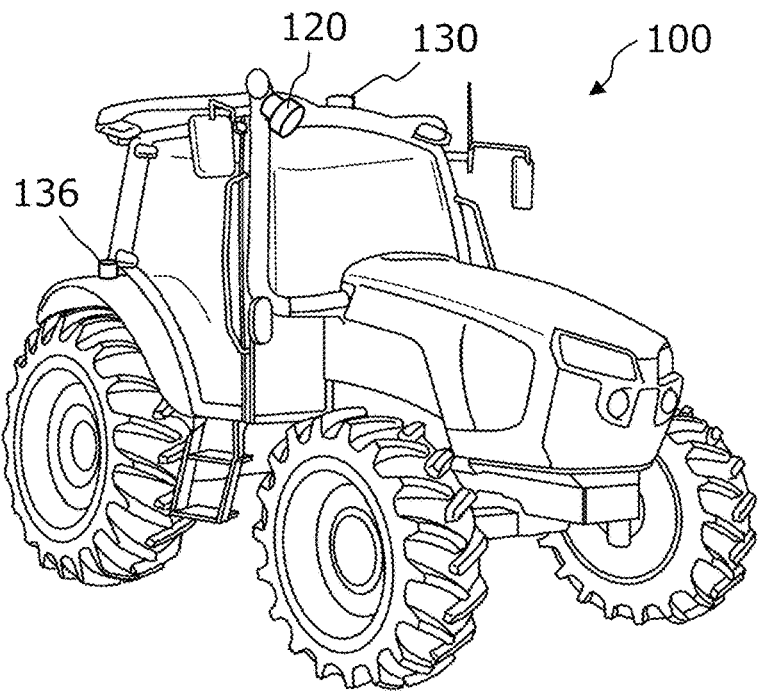
FIG. 29 is a perspective view showing an example appearance of an agricultural machine according to a preferred embodiment of the present disclosure.
Figure 30:
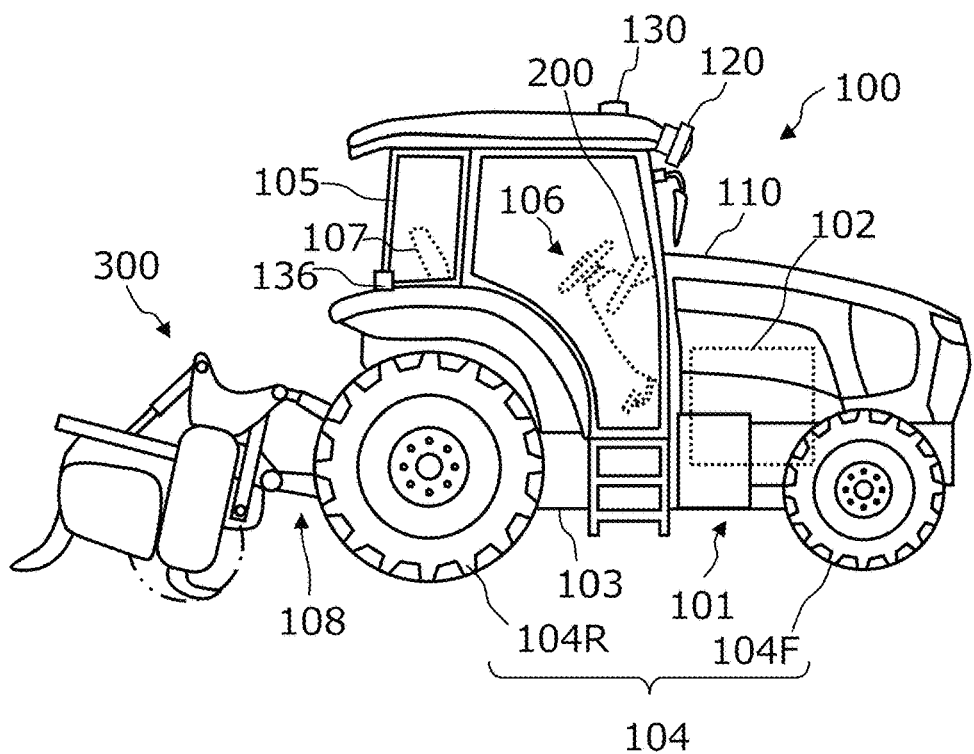
FIG. 30 is a side view schematically showing an example of the agricultural machine to which an implement is attached.

FIG. 29 is a perspective view showing an example appearance of the agricultural machine 100 according to the present preferred embodiment. FIG. 30 is a side view schematically showing an example of the agricultural machine 100 to which an implement 300 is attached. The agricultural machine 100 according to the present preferred embodiment is an agricultural tractor (work vehicle) having the implement 300 attached thereto. The agricultural machine 100 is not limited to a tractor, and does not need to have the implement 300 attached thereto. The crop row detection techniques according to example preferred embodiments of the present disclosure can exhibit excellent effects when used in small-sized crop management machines and vegetable transplanters that may be used for operations associated with the interridge land, such as ridge making, intertillage, ridging, weeding, side dressing, and preventive pest control, for example.

The agricultural machine 100 according to the present preferred embodiment includes an imaging device 120 (camera) and an obstacle sensor (s) 136. Although one obstacle sensor 136 is illustrated in FIG. 29, obstacle sensors 136 may be provided at a plurality of positions of the agricultural machine 100.

As shown in FIG. 30, the agricultural machine 100 includes a vehicle body 110, a prime mover (engine) 102, and a transmission 103. On the vehicle body 110, tires (wheels) 104 and a cabin 105 are provided. The tires 104 include a pair of front wheels 104F and a pair of rear wheels 104R. Inside the cabin 105, a driver's seat 107, a steering device 106, an operational terminal 200, and switches for manipulation are provided. Either the front wheels 104F or the rear wheels 104R may be crawlers, rather than tires. The agricultural machine 100 is a four-wheel drive vehicle including four wheels 104 as driving wheels, or a two-wheel drive vehicle including a pair of front wheels 104F or a pair of rear wheels 104R as driving wheels.

The positioning device 130 in the present preferred embodiment includes a GNSS receiver. The GNSS receiver includes an antenna to receive a signal (s) from a GNSS satellite (s) and a processing circuit to determine the position of the agricultural machine 100 based on the signal (s) received by the antenna. The positioning device 130 receive a GNSS signal (s) transmitted from a GNSS satellite (s), and performs positioning on the basis of the GNSS signal (s). GNSS is a general term for satellite positioning systems, such as GPS (Global Positioning System), QZSS (Quasi-Zenith Satellite System, e.g., MICHIBIKI), GLONASS, Galileo, BeiDou, and the like. Although the positioning device 130 in the present preferred embodiment is disposed above the cabin 105, it may be disposed at any other position.

Furthermore, the positioning device 130 may complement the position data by using a signal from an inertial measurement unit (IMU). The IMU can measure tilts and minute motions of the agricultural machine 100. By complementing the position data based on the GNSS signal using the data acquired by the IMU, the positioning performance can be improved.

In the examples shown in FIGS. 29 and 30, the obstacle sensor (s) 136 is provided at the rear of the vehicle body 110. The obstacle sensor (s) 136 may be disposed at any other position than the rear of the vehicle body 110. For example, one or more obstacle sensors 136 may be disposed at any position selected from among the sides of the vehicle body 110, the front of the vehicle body 110, and the cabin 105. The obstacle sensor (s) 136 detects objects around the agricultural machine 100. Each obstacle sensor 136 may include a laser scanner or an ultrasonic sonar, for example. When an object exists at a position closer to the obstacle sensor 136 than a predetermined distance, the obstacle sensor 136 outputs a signal indicating the presence of an obstacle. A plurality of obstacle sensors 136 may be provided at different positions of the body of the agricultural machine 100. For example, a plurality of laser scanners and a plurality of ultrasonic sonars may be disposed at different positions of the body. Providing a multitude of obstacle sensors 136 can reduce blind spots in monitoring obstacles around the agricultural machine 100.

The prime mover 102 may be a diesel engine, for example. Instead of a diesel engine, an electric motor may be used. The transmission 103 can change the propulsion and moving speed of the agricultural machine 100 through a speed changing mechanism. The transmission 103 can also switch between forward travel and backward travel of the agricultural machine 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the agricultural machine 100. The steering angle of the front wheels 104F can be changed by manipulating the steering wheel. The power steering device includes a hydraulic device or an electric motor to supply an assisting force for changing the steering angle of the front wheels 104F. When automatic steering is performed, under the control of a controller disposed in the agricultural machine 100, the steering angle may be automatically adjusted by the power of the hydraulic device or electric motor.

A linkage device 108 is provided at the rear of the vehicle body 110. The linkage device 108 may include, e.g., a three-point linkage (also referred to as a "three-point link" or a "three-point hitch"), a PTO (Power Take Off) shaft, a universal joint, and a communication cable. The linkage device 108 allows the implement 300 to be attached to or detached from the agricultural machine 100. The linkage device 108 is able to raise or lower the three-point linkage device with a hydraulic device, for example, thus controlling the position or pose of the implement 300. Moreover, motive power can be sent from the agricultural machine 100 to the implement 300 via the universal joint. While towing the implement 300, the agricultural machine 100 allows the implement 300 to perform a predetermined task. The linkage device may be provided frontward of the vehicle body 110. In that case, the implement may be connected frontward of the agricultural machine 100.

The implement 300 shown in FIG. 30 is a rotary cultivator, for example. The implement 300 to be towed by or attached to a tractor or other work vehicles when traveling along crop rows may be any kind, so long as it is used in operations associated with the interridge land, such as ridge making, intertillage, ridging, weeding, side dressing, and preventive pest control.

Figure 31:
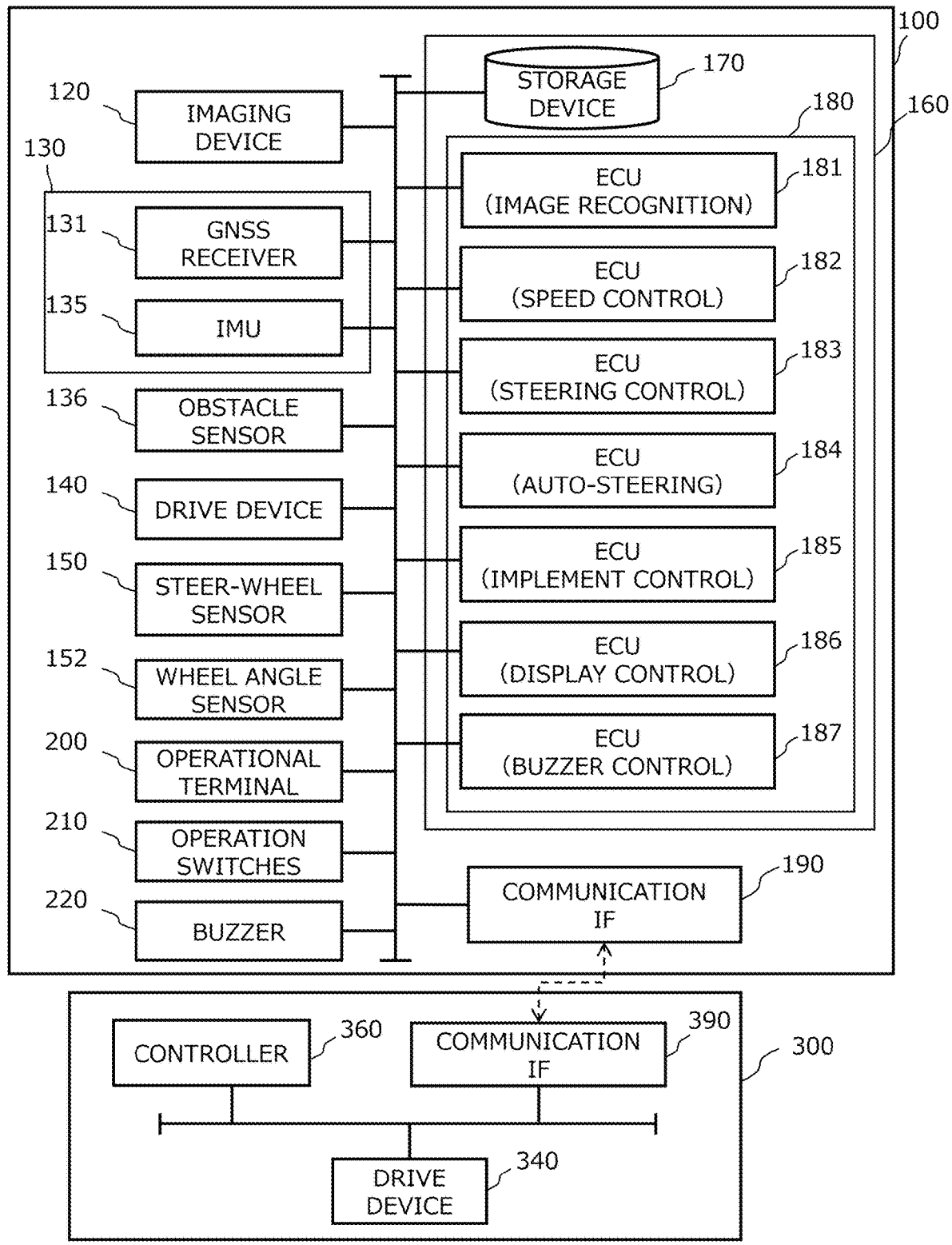
FIG. 31 is a block diagram showing an example of a schematic configuration of an agricultural machine and an implement.

FIG. 31 is a block diagram showing an example of a schematic configuration of the agricultural machine 100 and the implement 300. The agricultural machine 100 and the implement 300 can communicate with each other via a communication cable that is included in the linkage device 108.

In addition to the imaging device 120, the positioning device 130, the obstacle sensor 136, and the operational terminal 200, the agricultural machine 100 in the example of FIG. 31 includes a drive device 140, a steering wheel sensor 150, an angle-of-turn sensor (wheel angle sensor) 152, a control system 160, a communication interface (IF) 190, operation switches 210, and a buzzer 220. The positioning device 130 includes a GNSS receiver 131, an RTK receiver 122, and an inertial measurement unit (IMU) 125. The control system 160 includes a storage device 170 and a controller 180. The controller 180 includes a plurality of electronic control units (ECU) 181 to 186. The implement 300 includes a drive device 340, a controller 380, and a communication interface (IF) 390. Note that FIG. 31 shows elements which are relatively closely related to the operation of automatic steering or self-driving by the agricultural machine 100, while other elements are omitted from illustration.

The positioning device 130 performs positioning of the agricultural machine 100 by utilizing GNSS. In the case where the positioning device 130 includes a RTK receiver, not only GNSS signals transmitted from multiple GNSS satellites, but also a correction signal that is transmitted from a reference station is used. The reference station may be disposed around the field that is traveled by the agricultural machine 100 (e.g., at a position within 10 km of the agricultural machine 100). The reference station generates a correction signal based on the GNSS signals received from the multiple GNSS satellites, and transmits the correction signal to the positioning device 130. The GNSS receiver 131 in the positioning device 130 receives the GNSS signals transmitted from the multiple GNSS satellites. Based on the GNSS signals and the correction signal, the positioning device 130 calculates the position of the agricultural machine 100, thus achieving positioning. Use of an RTK- GNSS enables positioning with an accuracy on the order of several cm of errors, for example. Positional information (including latitude, longitude, and altitude information) is acquired through the highly accurate positioning by an RTK-GNSS. Note that the positioning method is not limited to an RTK-GNSS, any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System).

The IMU 135 includes a 3-axis accelerometer and a 3-axis gyroscope. The IMU 135 may include a direction sensor such as a 3-axis geomagnetic sensor. The IMU 135 functions as a motion sensor which can output signals representing parameters such as acceleration, velocity, displacement, and pose of the agricultural machine 100. Based not only on the GNSS signals and the correction signal but also on a signal that is output from the IMU 135, the positioning device 130 can estimate the position and orientation of the agricultural machine 100 with a higher accuracy. The signal that is output from the IMU 135 may be used for the correction or complementation of the position that is calculated based on the GNSS signals and the correction signal. The IMU 135 outputs a signal more frequently than the GNSS signals. Utilizing this highly frequent signal allows the position and orientation of the agricultural machine 100 to be measured more frequently (e.g., about 10 Hz or above). Instead of the IMU 135, a 3-axis accelerometer and a 3-axis gyroscope may be separately provided. The IMU 135 may be provided as a separate device from the positioning device 130.

In addition to or instead of the GNSS receiver 131 and the IMU 135, the positioning device 130 may include other kinds of sensors. Depending on the environment that is traveled by the agricultural machine 100, it is possible to estimate the position and orientation of the agricultural machine 100 with a high accuracy based on data from such sensors.

By using the positioning device 130 as such, it is possible to generate a map of crop rows as detected by the aforementioned crop row detection system 1000.

For example, the drive device 140 may include various devices that are needed for the traveling of the agricultural machine 100 and the driving of the implement 300, e.g., the aforementioned prime mover 102, transmission 103, differential including a locking differential mechanism, steering device 106, and linkage device 108. The prime mover 102 includes an internal combustion engine such as a diesel engine. Instead of an internal combustion engine or in addition to an internal combustion engine, the drive device 140 may include an electric motor that is dedicated to traction purposes.

The steering wheel sensor 150 measures the angle of rotation of the steering wheel of the agricultural machine 100. The angle-of-turn sensor 152 measures the angle of turn of the front wheels 104F, which are the wheels responsible for steering. Measurement values by the steering wheel sensor 150 and the angle-of-turn sensor 152 are used for the steering control by the controller 180.

The storage device 170 includes one or more storage media such as a flash memory or a magnetic disc. The storage device 170 stores various data that is generated by the sensors and the controller 180. The data that is stored by the storage device 170 may include map data in the environment that is traveled by the agricultural machine 100, and data of a target path of automatic steering. The storage device 170 also stores a computer program (s) to cause the ECUs in the controller 180 to perform various operations to be described later. Such a computer program (s) may be provided for the agricultural machine 100 via a storage medium (e.g., a semiconductor memory or an optical disc) or through telecommunication lines (e.g., the Internet). Such a computer program (s) may be marketed as commercial software.

The controller 180 includes a plurality of ECUs. The plurality of ECUs include an ECU 181 for image recognition, an ECU 182 for speed control, an ECU 183 for steering control, an ECU 184 for automatic steering control, an ECU 185 for implement control, an ECU 186 for display control, and an ECU 187 for buzzer control. The ECU 181 for image recognition functions as a processing device of the crop row detection system. The ECU 182 controls the prime mover 102, the transmission 103, and the brakes included in the drive device 140, thus controlling the speed of the agricultural machine 100. The ECU 183 controls the hydraulic device or electric motor included in the steering device 106 based on a measurement value of the steering wheel sensor 150, thus controlling the steering of the agricultural machine 100. The ECU 184 performs computations and controls for achieving auto-steer driving, based on signals which are output from the positioning device 130, the steering wheel sensor 150, and the angle-of-turn sensor 152. During auto-steer driving, the ECU 184 sends the ECU 183 a command to change the steering angle. In response to this command, the ECU 183 controls the steering device 106 to change the steering angle. In order to cause the implement 300 to perform a desired operation, the ECU 185 controls the operation of the linkage device 108. Also, the ECU 185 generates a signal to control the operation of the implement 300, and transmits this signal from the communication IF 190 to the implement 300. The ECU 186 controls displaying on the operational terminal 200. For example, the ECU 186 may cause a display device of the operational terminal 200 to present various indications, e.g., a map of the field, detected crop rows, the position of the agricultural machine 100 and a target path in the map, pop-up notifications, and setting screens. The ECU 187 controls outputting of alarm sounds by the buzzer 220.

Through the action of these ECUs, the controller 180 realizes driving via manual steering or automatic steering. During usual auto-steer driving, the controller 180 controls the drive device 140 based on the position of the agricultural machine 100 as measured or estimated by the positioning device 130 and the target path stored in the storage device 170. As a result, the controller 180 causes the agricultural machine 100 to travel along the target path. On the other hand, in a row-following control mode where travel is done along the crop rows, the ECU 181 for image recognition determines from a detected crop row the edge lines of the crop row, and generates a target path based on these edge lines. The controller 180 performs an operation in accordance with this target path.

The plurality of ECUs included in the controller 180 may communicate with one another according to a vehicle bus standard such as CAN (Controller Area Network). Although the ECUs 181 to 187 are illustrated as individual corresponding blocks in FIG. 31, each of these functions may be implemented by a plurality of ECUS. Alternatively, an onboard computer that integrates the functions of at least some of the ECUs 181 to 187 may be provided. The controller 180 may include ECUs other than the ECUs 181 to 187, and any number of ECUs may be provided in accordance with functionality. Each ECU includes a control circuit including one or more processors.

The communication IF 190 is a circuit that performs communications with the communication IF 390 of the implement 300. The communication IF 190 performs exchanges of signals complying with an ISOBUS standard such as ISOBUS-TIM, for example, between itself and the communication IF 390 of the implement 300. This causes the implement 300 to perform a desired operation, or allows information to be acquired from the implement 300. Moreover, the communication IF 190 can communicate with an external computer via a wired or wireless network. The external computer may be a server computer in a farming support system which centralizes management of information concerning fields by using a cloud, and assists in agriculture by utilizing the data on the cloud, for example.

The operational terminal 200 is a terminal for the user to perform a manipulation related to the traveling of the agricultural machine 100 and the operation of the implement 300, and may also be referred to as a virtual terminal (VT). The operational terminal 200 may include a display device such as a touch screen panel, and/or one or more buttons. By manipulating the operational terminal 200, the user can perform various manipulations, such as switching ON/OFF the automatic steering mode, switching ON/OFF the cruise control, setting an initial position of the agricultural machine 100, setting a target path, recording or editing a map, switching between 2WD/4WD, switching ON/OFF the locking differential, and switching ON/OFF the implement 300. At least some of these manipulations can also be realized by manipulating the operation switches 210. Displaying on the operational terminal 200 is controlled by the ECU 186.

The buzzer 220 is an audio output device to present an alarm sound to alert the user of an abnormality. For example, during auto-steer driving, the buzzer 220 may present an alarm sound when the agricultural machine 100 has deviated from the target path by a predetermined distance or more. Instead of the buzzer 220, a loudspeaker of the operational terminal 200 may provide a similar function. The buzzer 220 is controlled by the ECU 186.

The drive device 340 in the implement 300 performs a a necessary operation for the implement 300 to perform predetermined task. The drive device 340 includes devices adapted to the intended use of the implement 300, e.g., a pump, a hydraulic device, an electric motor, or a pump. The controller 380 controls the operation of the drive device 340. In response to a signal that is transmitted from the agricultural machine 100 via the communication IF 390, the controller 380 causes the drive device 340 to perform various operations. Moreover, a signal that is in accordance with the state of the implement 300 may be transmitted from the communication IF 390 to the agricultural machine 100.

In the above preferred embodiments, the agricultural machine 100 may be an unmanned work vehicle which performs self-driving. In that case, elements which are only required for human driving, e.g., the cabin, the driver's seat, the steering wheel, and the operational terminal, do not need to be provided in the agricultural machine 100. The unmanned work vehicle may perform a similar operation to the operation according to any of the above preferred embodiments via autonomous driving, or by remote manipulations by a user.

A system that provides the various functions according to preferred embodiments can be mounted as an add-on to an agricultural machine lacking such functions. Such a system may be manufactured and sold independently from the agricultural machine. A computer program for use in such a system may also be manufactured and sold independently from the agricultural machine. The computer program may be provided in a form stored in a computer-readable, non-transitory storage medium, for example. The computer program may also be provided through downloading via telecommunication lines (e.g., the Internet).

The techniques according to example preferred embodiments of the present disclosure can be applied to agricultural machines, such as vehicles for crop management, vegetable transplanters, or tractors, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A crop row detection system comprising:
   a camera mounted to an agricultural machine to image a ground surface traveled by the agricultural machine to acquire time-series color images including at least a portion of the ground surface; and
   a processor configured or programmed to:
   perform image processing for the time-series color images;
   generate from the time-series color images an enhanced image in which a color of a crop row for detection is enhanced to provide an enhanced image;
   generate from the enhanced image a plan view image as viewed from above the ground surface, the plan view image being classified into first pixels having a color index value for the crop row equal to or greater than a threshold and second pixels having the color index value below the threshold;
   split an entirety or a portion of the plan view image into a plurality of blocks;
   determine positions of edge lines of the crop row for each of the plurality of blocks based on the color index values of the first pixels; and
   determine a direction in which the crop row extends by connecting the positions of the edge lines in each of the plurality of blocks.

2. The crop row detection system of claim 1, wherein the processor is configured or programmed to:
   total the color index values of the first pixels along a plurality of scanning lines in the plan view image to determine total values, and generate a histogram in which positions of the scanning lines and the total values are associated; and
   determine the positions of the edge lines of the crop row based on the histogram.

3. The crop row detection system of claim 2, wherein the processor is configured or programmed to refer to the histogram, and determine the positions of the edge lines of the crop row from predetermined positions on opposite sides of a peak of the total values.

4. The crop row detection system of claim 1, wherein
   in the plan view image, the plurality of blocks have belt shapes that are continuous along a horizontal direction in the image or a vertical direction in the image; and
   the processor is configured or programmed to determine the edge lines of the crop row based on a belt shape in a direction that is different from a traveling direction of the agricultural machine.

5. The crop row detection system of claim 1, wherein
   the plan view image is an overhead view image in which a reference plane extending along the ground surface is viewed directly from above along a normal direction of the reference plane; and the processor is configured or programmed to generate the overhead view image through homography transformation from the time-series color images or preprocessed images of the time-series color images.

6. The crop row detection system of claim 5, wherein the reference plane is offset upward by a predetermined distance that is set in accordance with bumps and dents on the ground surface having the crops being planted thereon, from bottoms of the bumps and dents of the ground surface.

7. The crop row detection system of claim 1, wherein the processor is configured or programmed to generate and output a target path based on the positions of the edge lines of the crop row.

8. An agricultural machine comprising:
the crop row detection system of claim 1;
a wheel; and
an automatic steering controller configured or programmed to control a steering angle of the wheel based on the positions of the edge lines of the crop row as determined by the crop row detection system.

9. The agricultural machine of claim 8, wherein, based on the time-series color images, the processor is configured or programmed to monitor a positional relationship between the edge lines of the crop row and the wheel, and supply a positional error signal to the automatic steering controller.

10. A computer-implemented method of crop row detection, the method comprising:
acquiring from a camera mounted to an agricultural machine, time-series color images by imaging a ground surface that is traveled by the agricultural machine, the time-series color images including at least a portion of the ground surface;
generating from the time-series color images an enhanced image in which a color of a crop row for detection is enhanced;
generating from the enhanced image a plan view image as viewed from above the ground surface, the plan view image being classified into first pixels having a color index value for the crop row equal to or greater than a threshold and second pixels of having the color index value below the threshold;
splitting an entirety or a portion of the plan view image into a plurality of blocks;
determining positions of edge lines of the crop row for each of the plurality of blocks based on the color index values of the first pixels; and
determining a direction in which the crop row extends by connecting the positions of the edge lines in each of the plurality of blocks.

\* \* \* \* \*